(12) United States Patent
Basadzishvili

(10) Patent No.: US 8,746,383 B2
(45) Date of Patent: Jun. 10, 2014

(54) VEHICLE SUSPENSION AND DRIVE SYSTEM

(76) Inventor: Victor Basadzishvili, Brooklyn, NY (US)

(*) Notice: Subject to any disclaimer, the term of this patent is extended or adjusted under 35 U.S.C. 154(b) by 565 days.

(21) Appl. No.: 13/037,707

(22) Filed: Mar. 1, 2011

(65) Prior Publication Data

US 2011/0209938 A1    Sep. 1, 2011

Related U.S. Application Data

(60) Provisional application No. 61/309,246, filed on Mar. 1, 2010.

(51) Int. Cl.
*B60K 1/02* (2006.01)

(52) U.S. Cl.
USPC .................... 180/65.51; 280/124.1; 267/68

(58) Field of Classification Search
USPC .............. 180/65.51, 65.6; 280/124.1, 86.751; 267/68
See application file for complete search history.

(56) References Cited

U.S. PATENT DOCUMENTS

| | | | | |
|---|---|---|---|---|
| 1,041,097 A | * | 10/1912 | Kennedy | 280/124.126 |
| 1,093,131 A | * | 4/1914 | Hays | 280/124.127 |
| 1,984,694 A | * | 12/1934 | Nottoli | 267/68 |
| 2,155,521 A | * | 4/1939 | Zavarella | 280/124.127 |
| 3,578,354 A | * | 5/1971 | Schott | 280/124.126 |
| 6,113,119 A | * | 9/2000 | Laurent et al. | 280/124.1 |
| 7,770,677 B2 | * | 8/2010 | Takenaka | 180/65.51 |
| 7,861,813 B2 | * | 1/2011 | Gashi et al. | 180/65.51 |
| 7,938,210 B2 | * | 5/2011 | Kunzler et al. | 180/65.51 |
| 8,037,957 B2 | * | 10/2011 | Laurent | 180/65.51 |
| 2006/0012144 A1 | * | 1/2006 | Kunzler et al. | 280/124.125 |
| 2006/0137926 A1 | * | 6/2006 | Taniguchi et al. | 180/65.5 |
| 2008/0100021 A1 | * | 5/2008 | Yamada | 280/124.127 |
| 2008/0185807 A1 | * | 8/2008 | Takenaka | 280/124.153 |
| 2008/0203693 A1 | * | 8/2008 | Yamada | 280/124.127 |
| 2011/0209938 A1 | * | 9/2011 | Basadzishvili | 180/305 |

* cited by examiner

Primary Examiner — Jeffrey J Restifo
Assistant Examiner — Erez Gurari
(74) Attorney, Agent, or Firm — Evelyn M. Sommer

(57) ABSTRACT

An in-the-wheel hub-less suspension system for use on a vehicle is disclosed. The suspension mechanism has at least two vertical guides; at least two mounting brackets to be affixed to diametrically opposing positions on the rim of the wheel to which the suspension system is to be attached; at least one shock absorber unit; and one spring for each vertical guide. Each of the vertical guides extends through one of the at least one shock absorber units, wherein the spring for each vertical guide is located underneath the at least one shock absorber unit and encloses the vertical guide; and wherein each end of each of the at least two vertical guides engages with the corresponding mounting bracket.

7 Claims, 41 Drawing Sheets

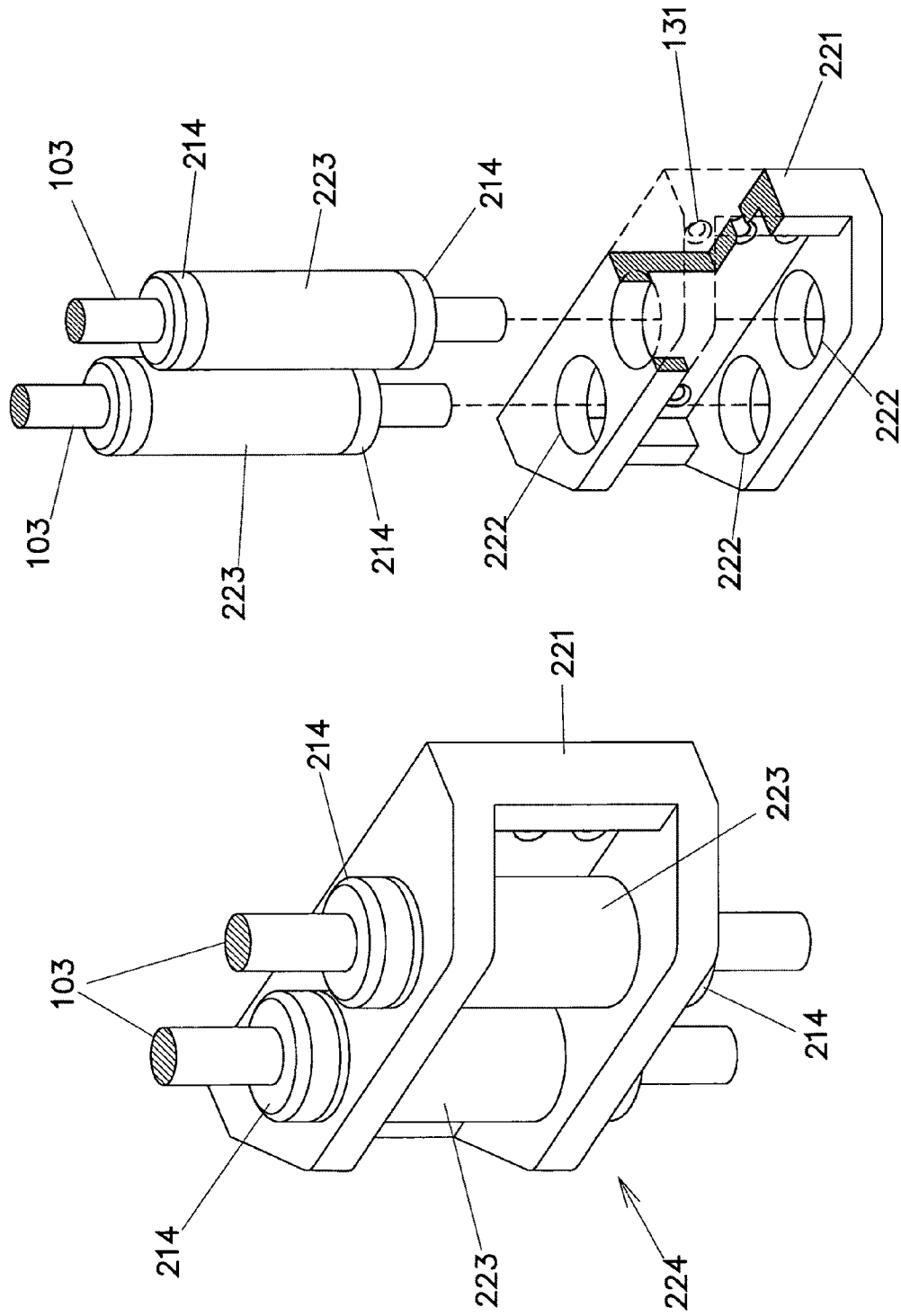

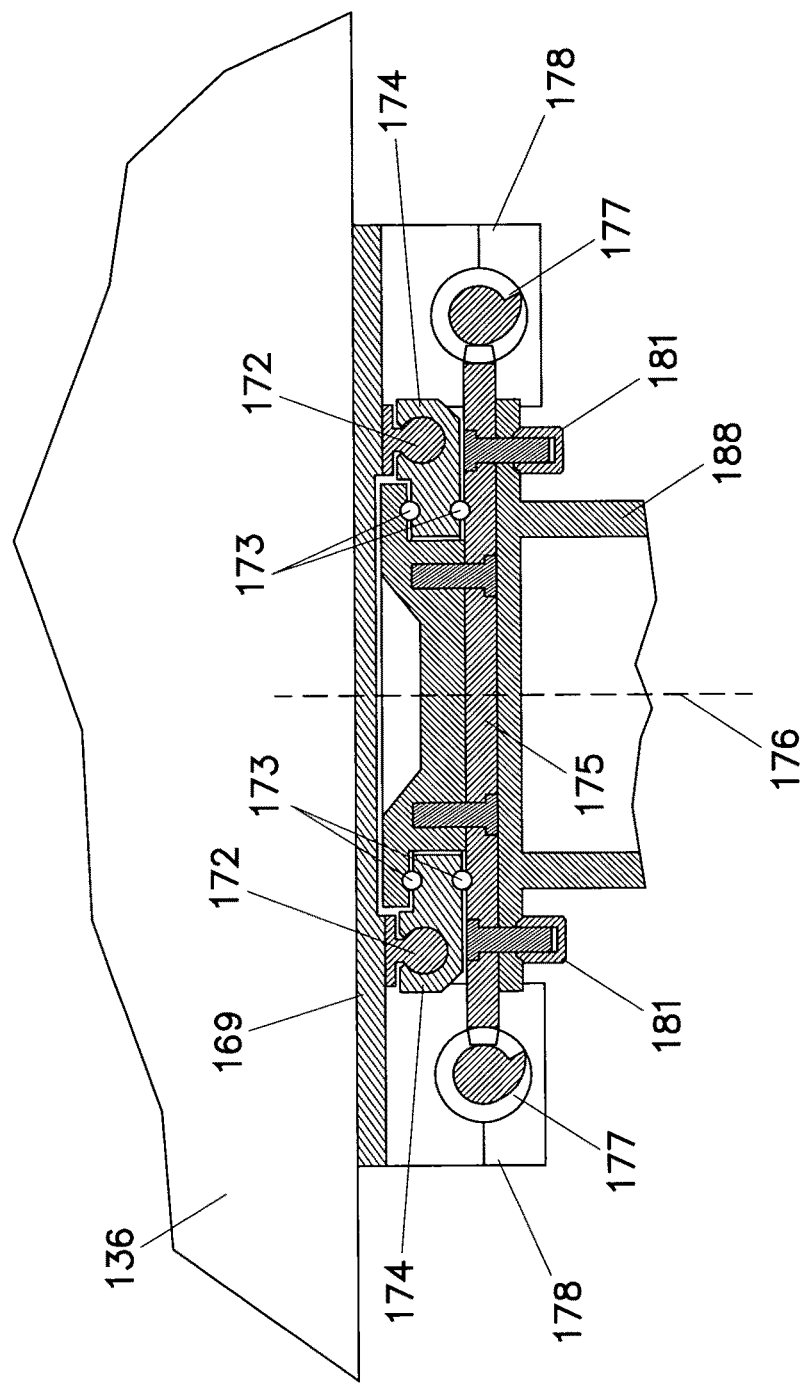

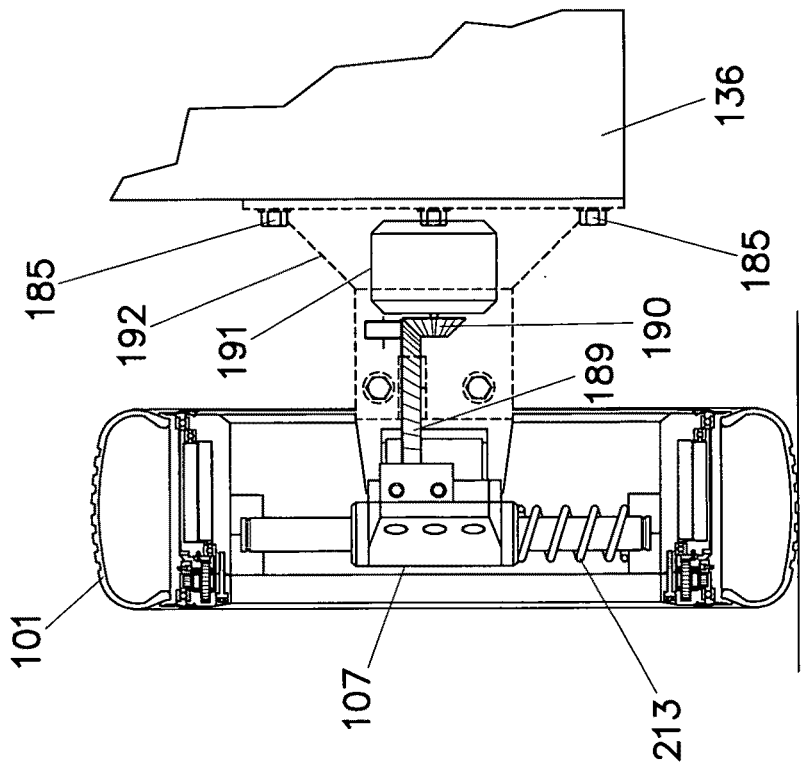
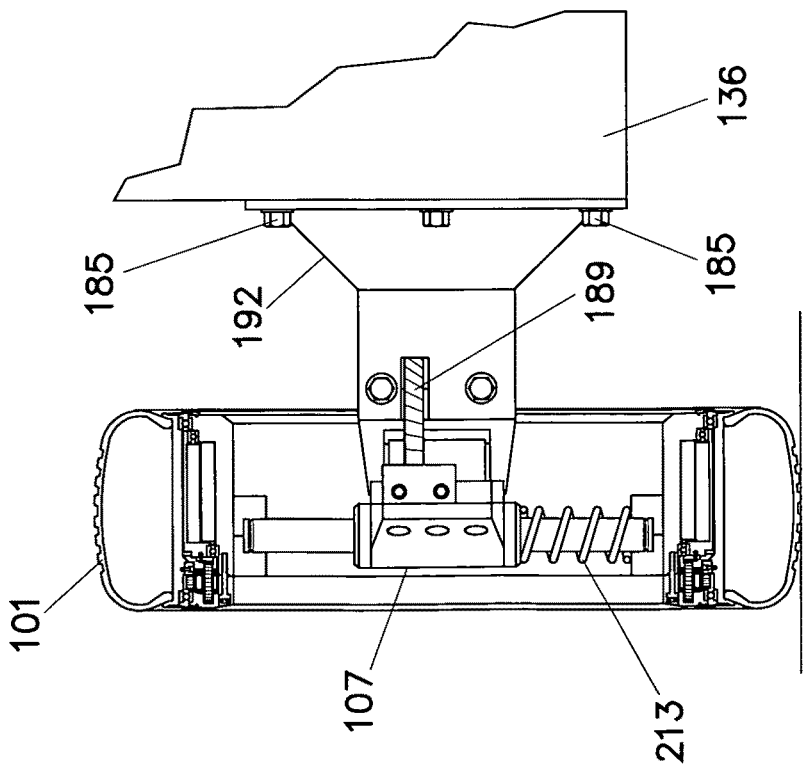

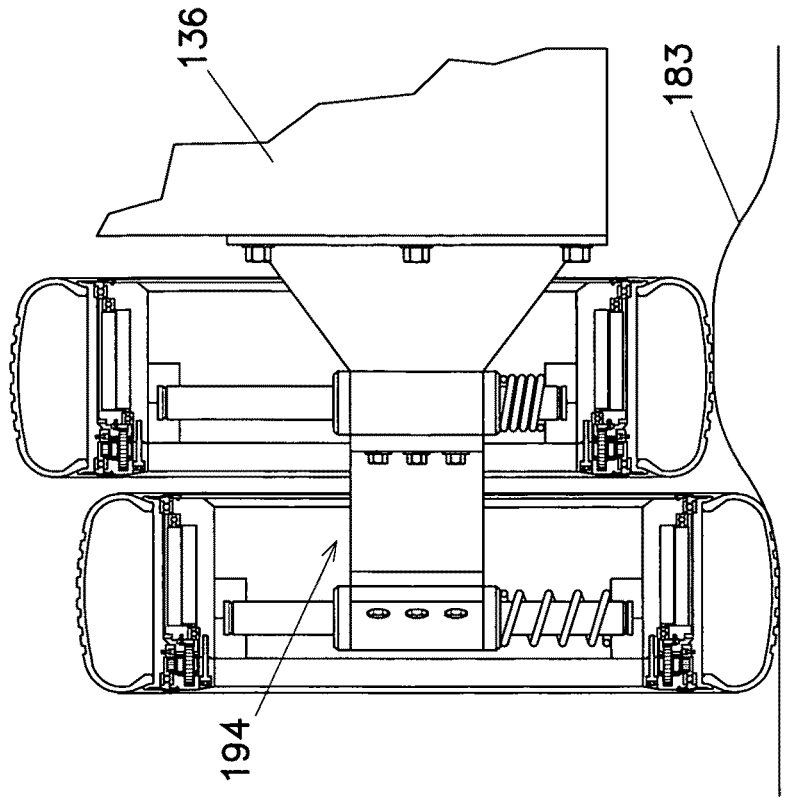
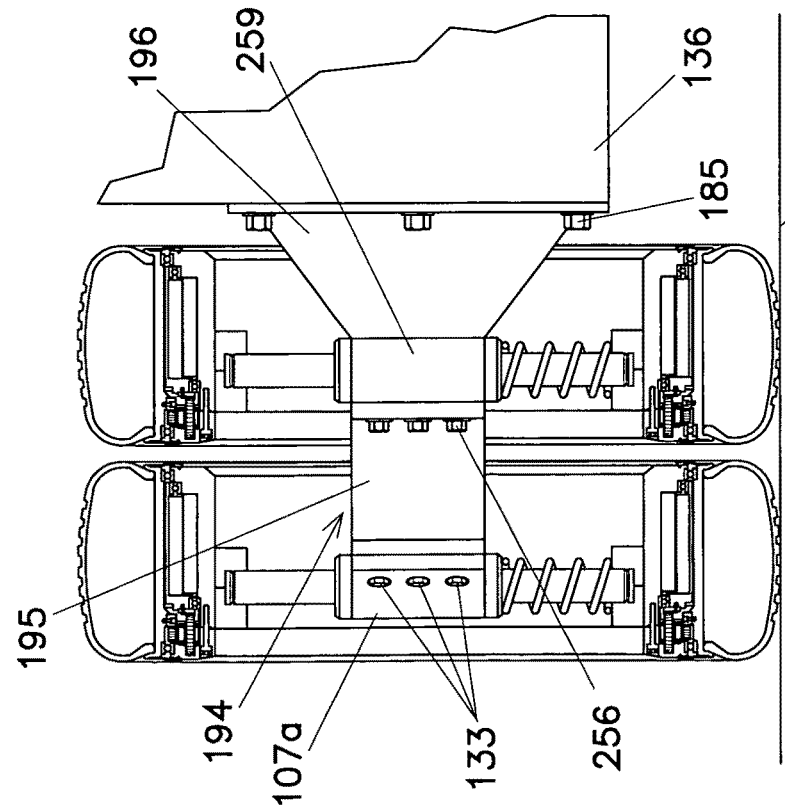
FIG. 29A
FIG. 29B

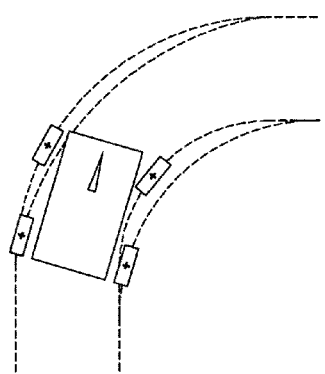
FIG. 30A
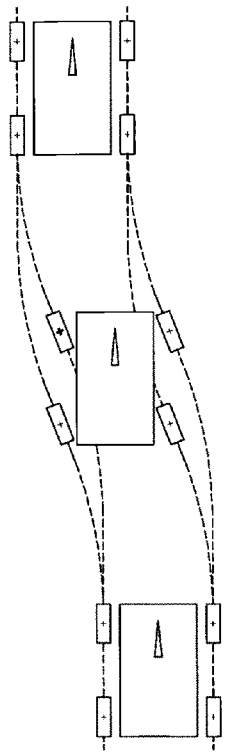
FIG. 30C
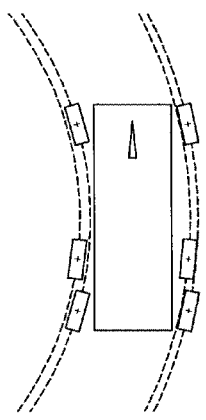
FIG. 30D
FIG. 30B
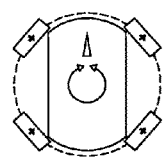
FIG. 30E

VEHICLE SUSPENSION AND DRIVE SYSTEM

REFERENCE TO RELATED APPLICATION

This application claims the benefit of application Ser. No. 61/309,246 filed Mar. 1, 2010, which is incorporated herein by reference.

FIELD OF THE INVENTION

This invention relates to vehicle suspension and drive systems.

BACKGROUND OF THE INVENTION

A variety of approaches have been undertaken in the art to provide improved vehicular suspension systems and equipment. Each of these advances is accompanied by omissions addressed by the present disclosure.

U.S. Pat. Appl. Publ. No. 2006/0012144 teaches an in-the-wheel suspension system including a drive mechanism for coupling the rotational motion of a wheel rim to the drive shaft of an electric motor and for supporting the wheel rim with respect to the vehicle chassis using one or more springs and dampers.

U.S. Pat. Appl. Publ. No. 2006/0272871 teaches a suspension system including an outer rotor type motor within the wheel. The motor has a stator provided on an outer surface of a cylindrical member that defines space open to at least an inboard side of the vehicle.

U.S. Pat. Appl. Publ. No. 2006/0144626 teaches an in-wheel motor including a motor generating motive power, a planetary gear arranged toward a wheel disc relative to the motor to reduce an output of the motor and a shaft arranged toward the wheel disc relative to the planetary gear and connected to a planetary carrier.

U.S. Pat. Appl. Publ. No. 2005/0247496 teaches an in-wheel motor system wherein the rotating case of an in-wheel motor is connected to a wheel by a flexible coupling comprising a plurality of hollow disk-like plates and direct-acting guides.

U.S. Pat. Appl. Publ. No. 2006/0219449 teaches a bearing for supporting rotation of either of a rotor and a planetary gear, which is supported by a wall disposed between a motor housing and a gear case room.

U.S. Pat. Appl. Publ. No. 2006/0137926 teaches an electrically motorized assembly equipped with at least one electric motor having an output shaft located eccentrically from an axle of a wheel.

U.S. Pat. No. 1,041,097 teaches a combined vehicle hub and shock absorber.

U.S. Pat. No. 3,578,354 teaches a vehicle suspension system wherein each wheel of the vehicle is supported on a spindle rotatably carried within a hub housing provided with a pair of radially extending pins having a common axis perpendicular to the axis of the spindle.

U.S. Pat. No. 6,722,459 teaches an axle having a bridge arranged at a distance from the wheel axle. The housing of a driving engine is connected with the bridge and with suspension elements, on one side of the axle, to secure the axle to the vehicle and, on the other side, with a hub carrier to receive forces of the wheel. The driving engine has a sufficient axial distance from the wheel axle so as to create a space, in a direction opposite to the axial distance, so that a disk brake and portion of the actuation device of the disk brake can be located within the wheel rim.

U.S. Pat. No. 6,113,119 teaches a wheel connecting assembly for an automobile which includes a wheel carrier and a support having a guide member for guiding the wheel carrier in translational movement relative to the support.

All of the foregoing U.S. Patents and U.S. Patent Applications are incorporated herein by reference.

The suspension and drive system of the present invention has a multitude of advantages over previous vehicle designs, including simplicity of the design and assembly, light weight, space savings, faster and low cost assembly and repair, independent controls on all wheels (steering, drive and all suspension-related functions), improved overall vehicle performance, and optimal suspension performance.

The subject design configuration also will allow manufacturers to use the same parts or even the same units, in different vehicle designs, with or only minor changes.

SUMMARY OF THE INVENTION

As described in detail below, there is disclosed an in-the-wheel hub-less suspension system for use on a vehicle. The suspension mechanism has at least two vertical guides; at least two mounting brackets to be affixed to diametrically opposing positions on the rim of the wheel to which the suspension system is to be attached; at least one shock absorber unit; and one spring for each vertical guide. Each of the vertical guides extends through one of the at least one shock absorber units, wherein the spring for each vertical guide is located underneath the at least one shock absorber unit and encloses the vertical guide; and wherein each end of each of the at least two vertical guides engages with the corresponding mounting bracket.

In the subject in-the-wheel hub-less suspension system for use on a vehicle, the at least one shock absorber unit preferably further comprises at least one cavity; at least one top orifice; at least one bottom orifice; at least one top cap with a first through-hole; at least one bottom cap with a second through-hole; at least one first seal for each of the at least one top cap; and at least one second seal for each of the at least one bottom cap; wherein the top orifice and the bottom orifice are coaxial, wherein the top cap is secured onto the top orifice and the bottom cap is secured onto the bottom orifice, wherein the first hole in the top cap, the top orifice, the second hole in the bottom cap, the bottom orifice and the at least one cavity form a third through-hole through which each of the at least two vertical guides extend, and wherein the at least one first seal for each of the at least one top cap creates a tight seal between the at least one top cap and the vertical guide and the at least one second seal for each of the at least one bottom cap creates a tight seal between the at least one bottom cap and the vertical guide.

The suspension system may further comprise an inner ring of the hub-less rim; an outer ring of the hub-less rim; and a drive system comprising an electric step motor comprising a stator part and a rotary part, the stator part being attached to the inner ring and the rotary part being attached to the outer ring.

Alternatively, the suspension system may further comprise an inner ring of the hub-less rim; a middle ring of the hub-less rim; an outer ring of the hub-less rim; and a drive system comprising an electric step motor located in the rim structure and comprising a stator part and a rotary part, the stator part being attached to the inner ring and the rotary part being attached to the middle ring.

In another embodiment, the suspension system may further comprise an inner ring of the hub-less rim; an outer ring of the hub-less rim; a frame located in the hub of the rim, the frame adapted for attachment to the chassis of the vehicle; a two-part drive motor located inside the frame; and a mechanical power transfer system comprising: a first pair of gears coupled to the drive shaft of each part of the two-part drive motor, and located inside the frame; a third gear coupled to the first pair of gears and located in the frame; a first shaft having a first end and a second end, the first end of the first shaft being engaged with the third gear; a second shaft located coaxial to the first shaft and having a first end and a second end, the second end of the first shaft being engaged with the first end of the second shaft; a fourth gear engaged to the second end of the second shaft; and a fifth gear engaged to the fourth gear and being rigidly attached to the outer ring; wherein the first shaft further comprises a first engaging means and the second shaft further comprises a first matching engaging means and the first engaging means and the second engaging means engage to allow the transmission of rotational motion from the first shaft to the second shaft about the common longitudinal axis.

In still a further embodiment, the suspension system may further comprise an inner ring of the hub-less rim; an outer ring of the hub-less rim; a frame located in the hub of the rim, the frame being adapted for attachment to the chassis of the vehicle; a two-part drive motor located inside the frame; and a hydraulic power transfer system comprising: a hydraulic pump rigidly attached to the frame and coupled to the drive shafts of the two-part drive motor; at least one hydraulic motor rigidly mounted onto the inner ring; at least one high-pressure hose having a first end and a second end, the first end connected to the hydraulic pump and the second end connected to the hydraulic motor; a hydraulic fluid in the hydraulic pump, the hydraulic motor and the high-pressure hose; a first gear located in the space between the inner ring and the outer ring, the first gear coupled to the drive shaft of the hydraulic motor; and a second gear rigidly connected to the outer ring, the second gear engaged with the first gear.

In any of the foregoing embodiments, the two-part drive motor may be an electric step motor.

The subject suspension system facilitates a method of independently controlling at least one parameter of a wheel on a vehicle, the parameter being selected from the direction, caster angle, camber angle, toe angle, ride height and speed, and comprising the steps of measuring the at least one parameter of a wheel independently; determining the optimum value of the parameter; calculating the difference between the measured value and the optimum value of the parameter; and activating an actuator in response to the difference to adjust the parameter.

BRIEF DESCRIPTION OF THE DRAWINGS

FIG. 11A is a perspective view of a part of the suspension system capable of replacing a part shown on FIGS. 10A-10B according to a third embodiment of the present invention.

FIG. 11B is a perspective view of the object as shown in FIG. 11A, with the shells removed from the bracket.

FIG. 17B is a cross-sectional view of the vehicle ground clearance adjustment unit shown in FIG. 17A taken along the line A17b-A17b.

FIG. 27A is a front view of the suspension system (hub-less wheel cut for a better view) comprising a steering system in accordance with a second embodiment of the present invention, wherein steering is powered through electric motor.

FIG. 27B is a further front view of the suspension system (hub-less wheel cut for a better view) comprising a steering system in accordance with a second embodiment of the present invention, wherein steering is powered through electric motor.

FIG. 29A is a front view of the hub-less wheel in double wheel configuration with the hub-less wheel cut for a better view of the suspension system.

FIG. 29B is a front view of the hub-less wheel FIG. 29A with the hub-less wheel cut for better viewing as observed while traveling on an uneven surface.

FIG. 30A is a top view of one of the vehicle's traveling direction possibilities.

FIG. 30B is a top view of another one of the vehicle's traveling direction possibilities.

FIG. 30C is a top view of another one of the vehicle's traveling direction possibilities.

FIG. 30D is a top view of another one of the vehicle's traveling direction possibilities.

FIG. 30E is a top view of another one of the vehicle's traveling direction possibilities.

FIG. 31A is a cross-sectional view of the suspension part 107 shown in FIG. 3 taken along the line A31a-A31a.

DETAILED DESCRIPTION OF THE INVENTION

In-Wheel Suspension System

Figure 1:
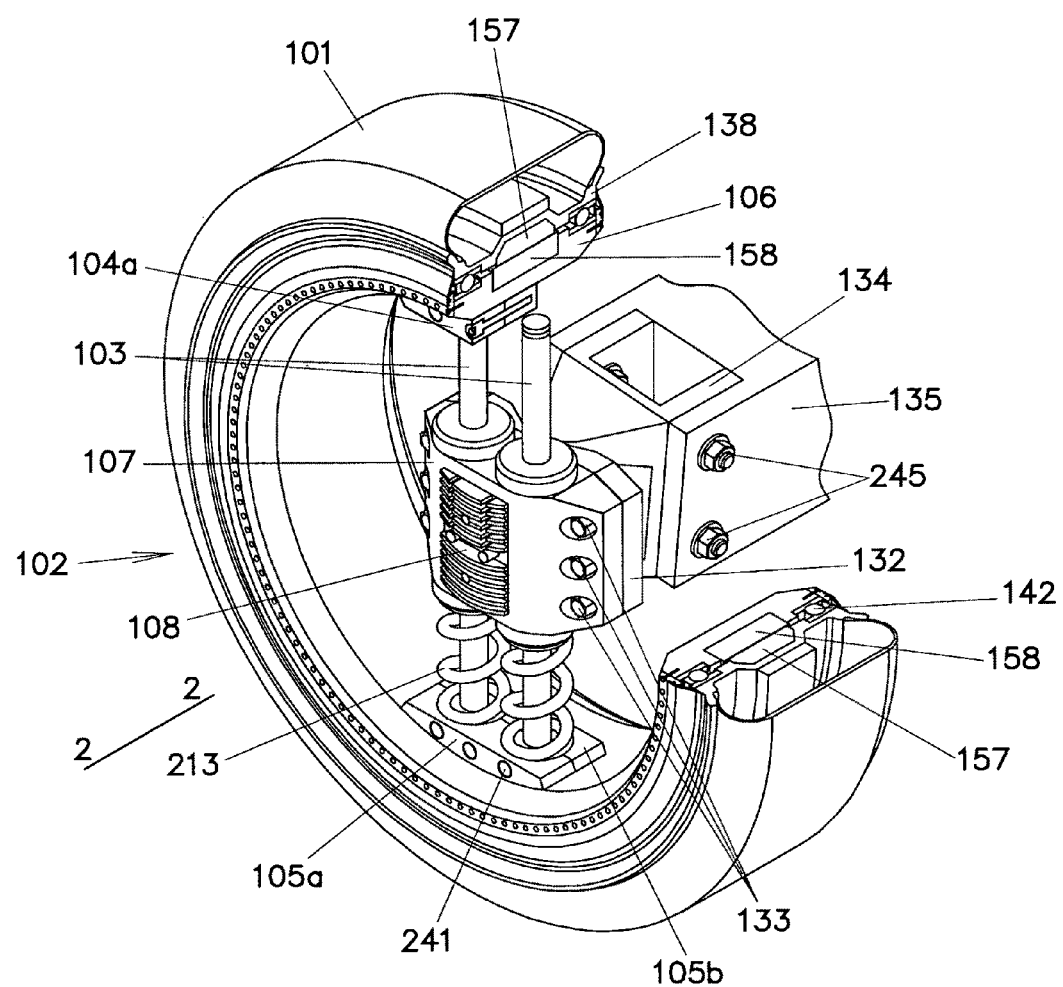
FIG. 1 is a perspective view of a hub-less wheel comprising an in-the-wheel suspension system in accordance with a first embodiment of the present invention, with a portion of the wheel cut out.
Figure 20:
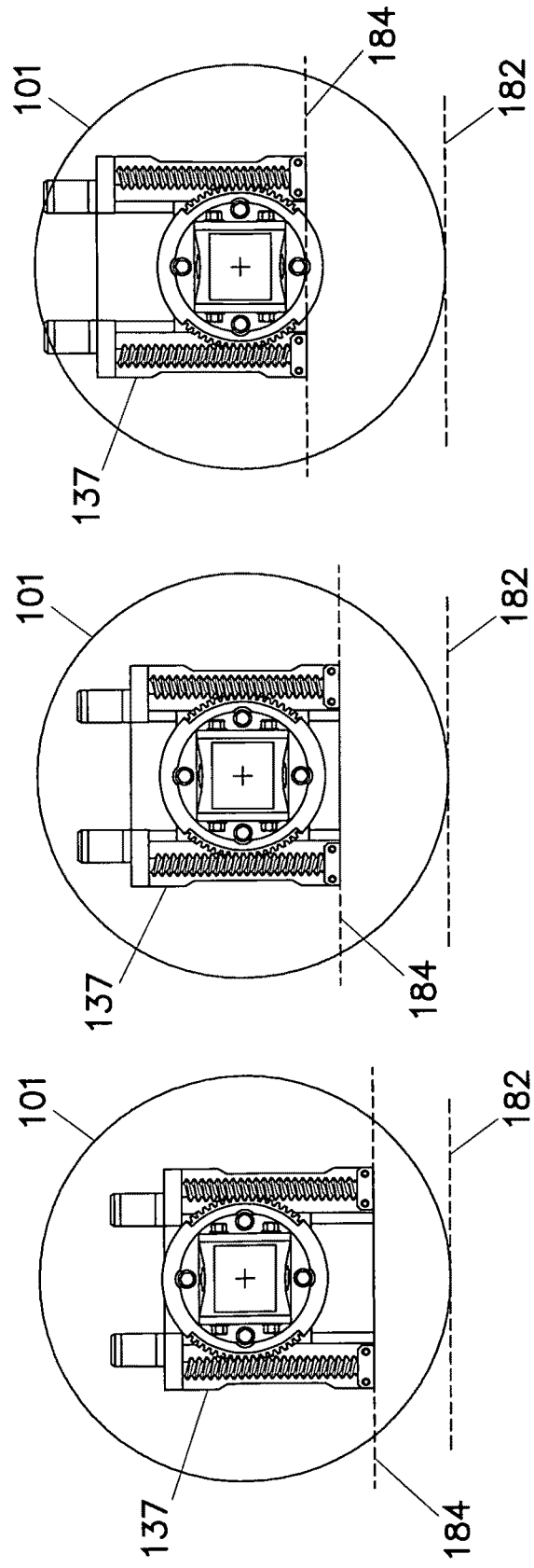
FIG. 20A is a side view of the vehicle ground clearance adjustment unit, while traveling on uneven road surface.
FIG. 20B is a further side view of the vehicle ground clearance adjustment unit, while traveling on uneven road surface.
FIG. 20C is a further side view of the vehicle ground clearance adjustment unit, while traveling on uneven road surface.
Figure 21:
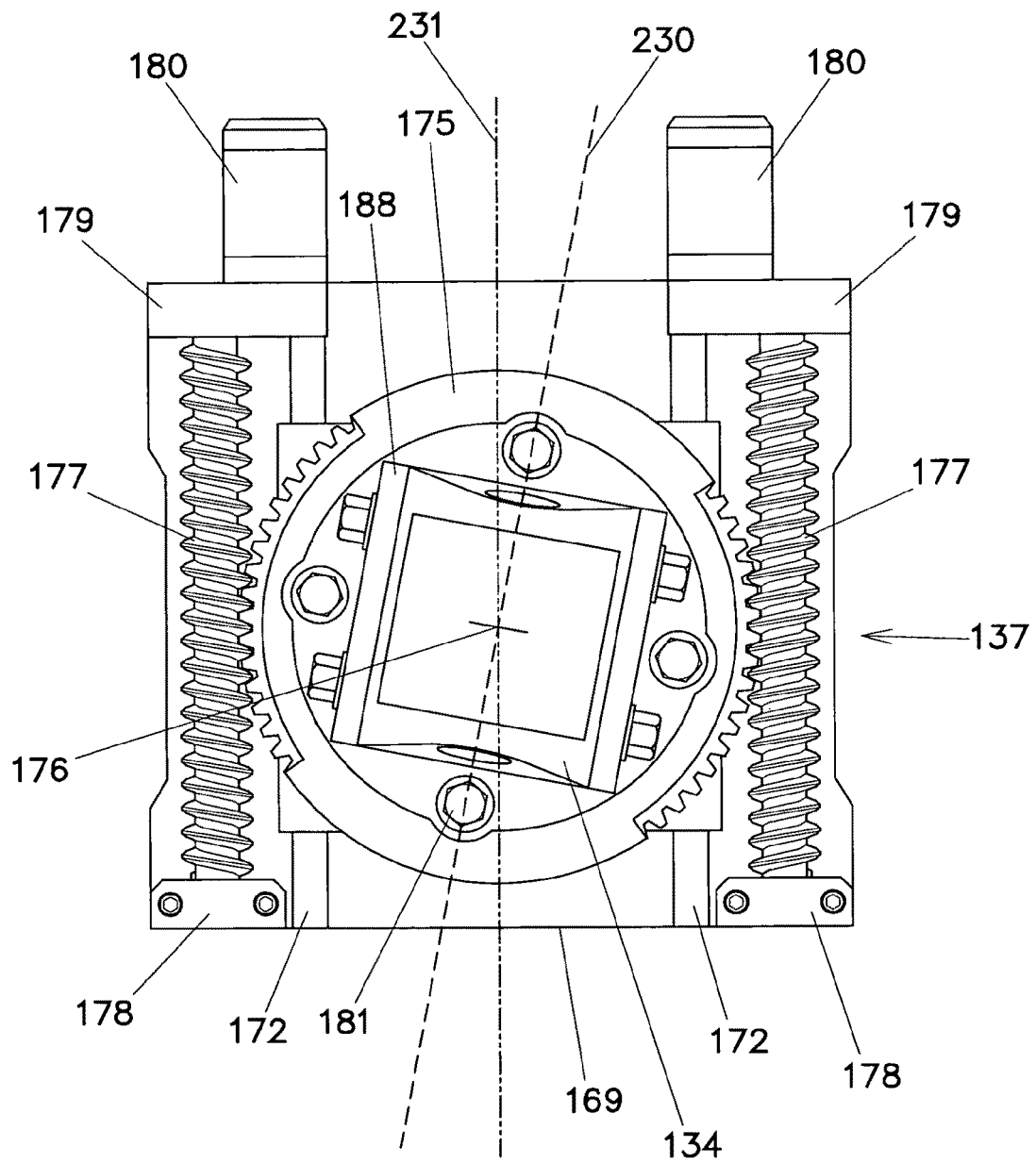
FIG. 21 is a side view of the vehicle adjustment unit with caster angle more or less than zero degrees.

An in the-wheel, hub-less suspension system is shown in FIG. 1. The suspension system can be utilized for controlling suspension movement, such as, springing, damping, and steering for use on a vehicle such as car, truck, bus, and motorcycle. The suspension and drive system permits use in all wheel drive vehicles such as cars, trucks, buses, and even all-wheel drive motorcycles. Preferably, the suspension system can additionally be used to control one or more parameters including camber, caster and ground clearance adjustment as shown in FIGS. 20-21.

The suspension system is placed inside a hub-less rim assembly 102 on which a tire 101 can be mounted. The suspension system is completely contained inside the space enclosed by the hub-less rim assembly 102.

Figure 8:
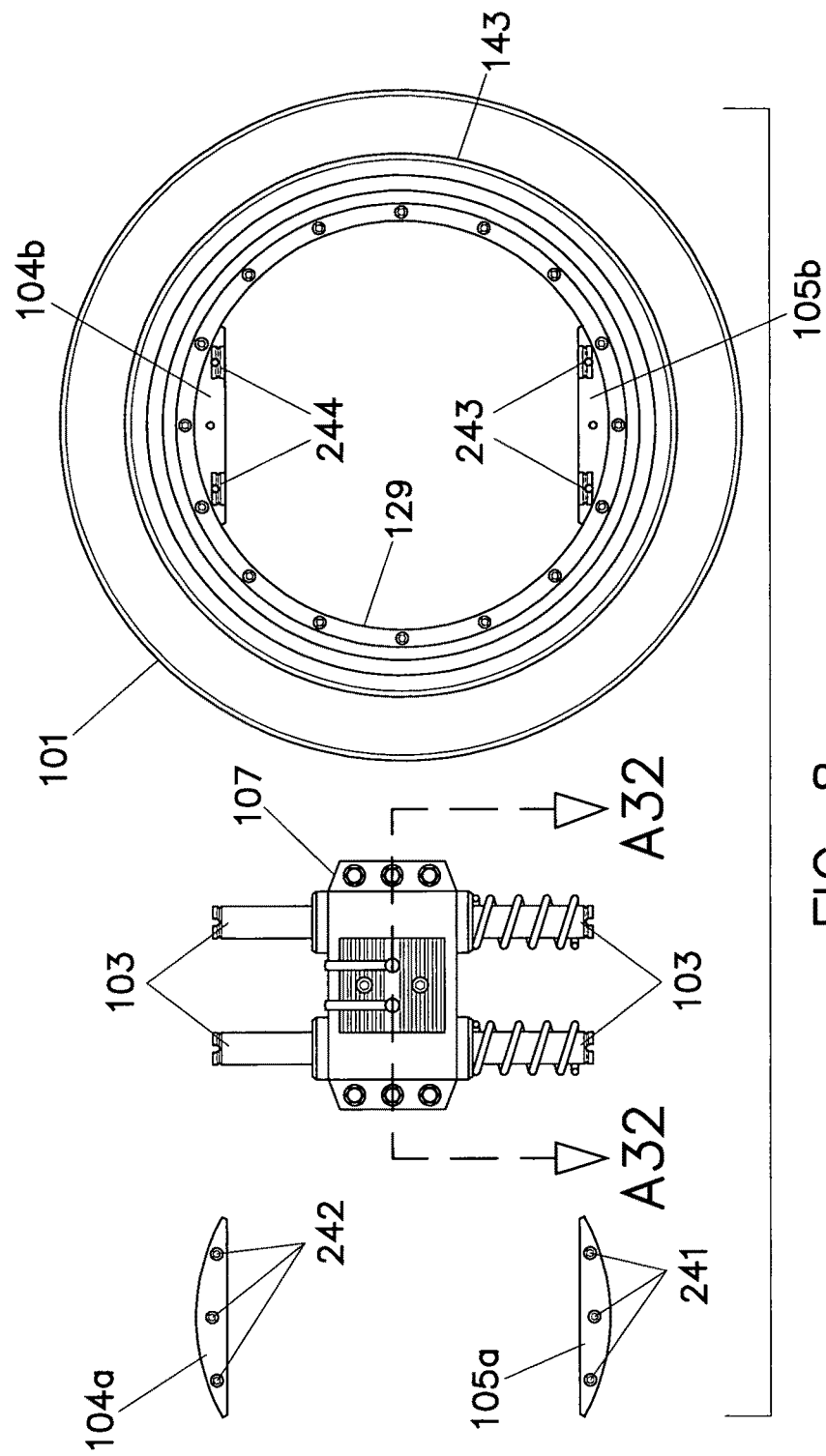
FIG. 8 is a front view of the disassembled hub-less wheel.
Figure 31A:
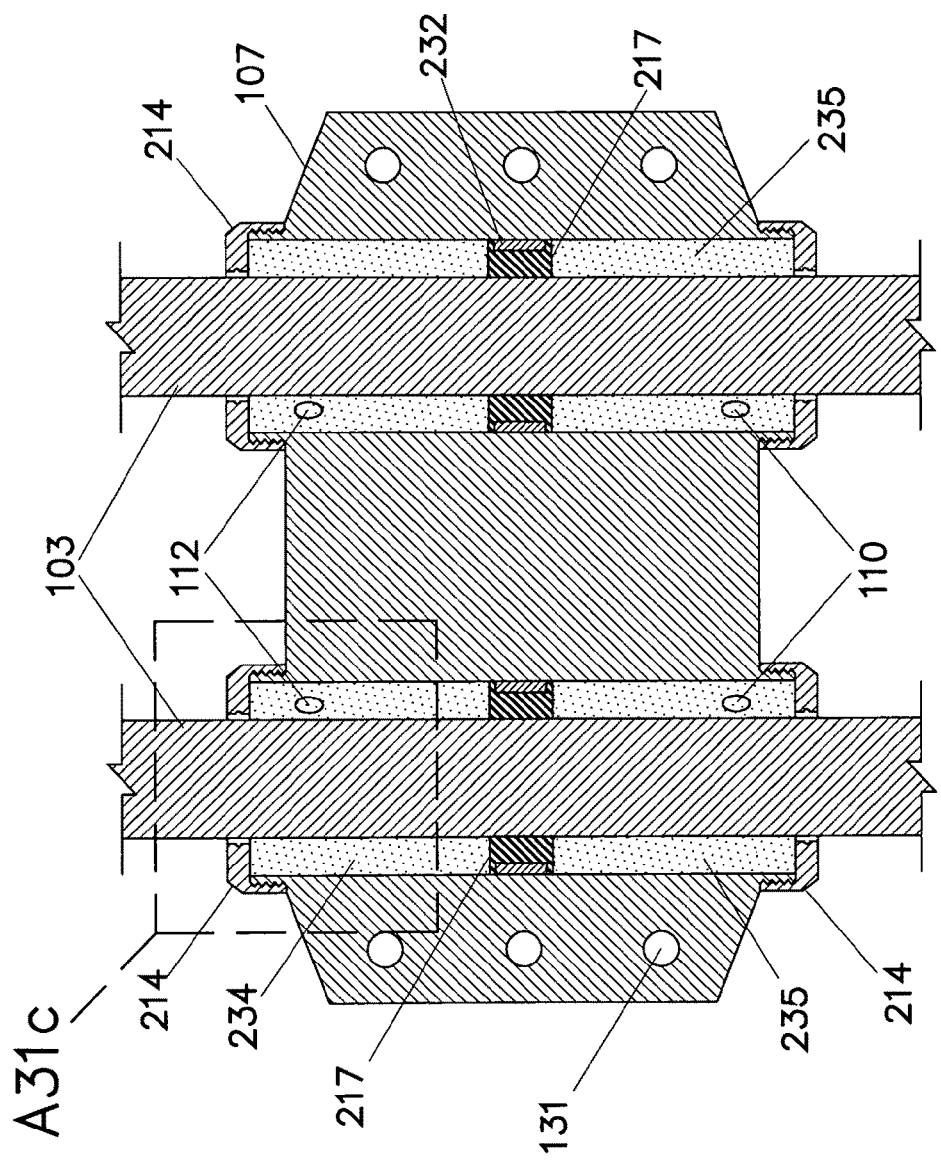
Figure 31B:
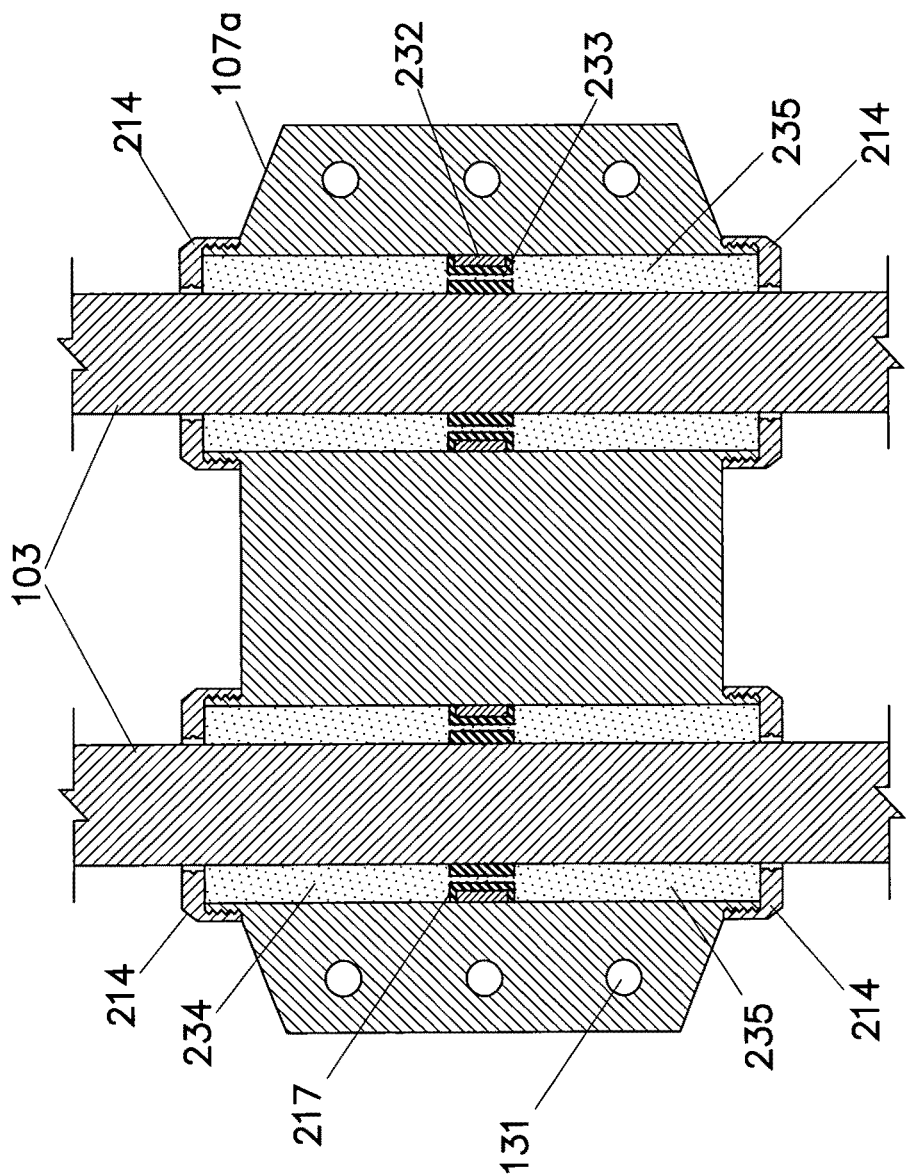
FIG. 31B is a cross-sectional view of the suspension system part 107a shown in FIG. 6 taken along the line A31b-A31b.
Figure 31C:
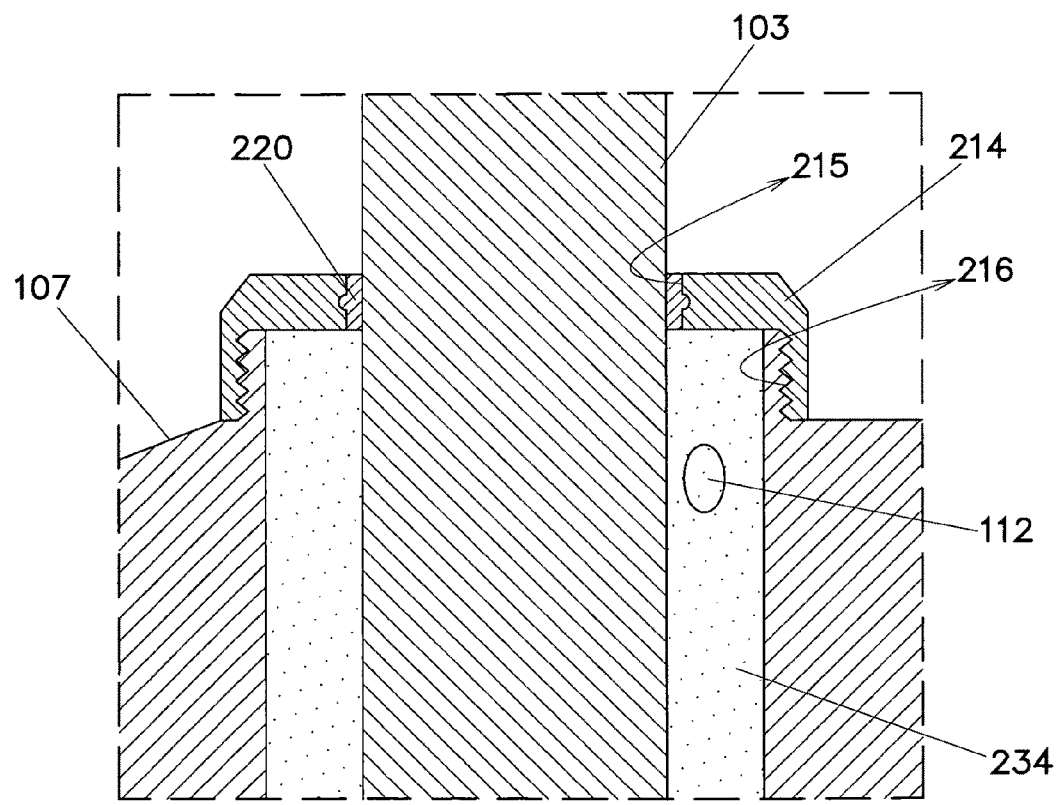
FIG. 31C is an expended view of the rectangle-shaped area A31c of FIG. 31A.

As shown in FIGS. 1-4, the suspension system comprises two or more, preferably two, vertical guides 103, a top bracket assembly 104 (bracket 104 comprises two parts 104a and 104b) and bottom bracket assembly 105 (bracket 105 comprises two parts 105a and 105b), a shock absorber unit 107, springs 213 and miscellaneous parts (infra) for properly engaging aforementioned elements such as the caps 214 (shown in FIGS. 10A-10B, 31A-31C) and the seals 220 (shown in FIGS. 31A-31C). The vertical guides 103 are mounted to the inner rim 106 by clamping the upper end of the guide 103 between brackets 104a and 104b where bracket 104b is rigidly attached with bolts and nuts or permanently welded to the inner surface of the inner ring 106. The lower end of the guide 103 is clamped between brackets 105a and 105b, where 105b rigidly attached with bolts and nuts or permanently welded to the inner ring 106 as shown in FIG. 1 and FIG. 8. The shock absorber unit 107, which is attached to the steering knuckle 132 by means of at least two, preferably four to six lug nuts 133 as shown in FIG. 1 (the exact number depending on the vehicle specification), and circles the vertical guides 103 and travels in the longitudinal direction of the same.

Figure 5:
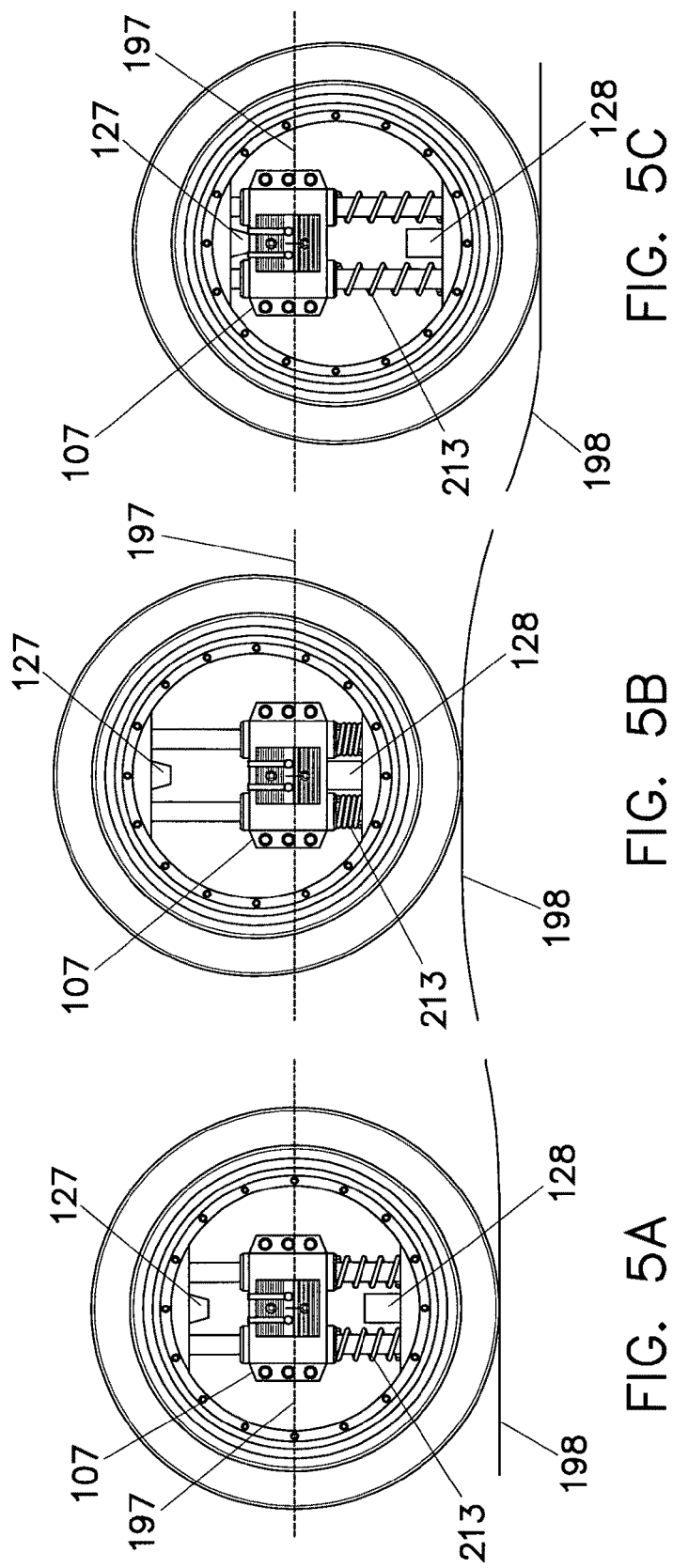
FIG. 5A is another side view (as in FIG. 2) of the hub-less wheel as observed while traveling on an uneven surface.
FIG. 5B is another side view (as in FIG. 2) of the hub-less wheel as observed while traveling on an uneven surface.
FIG. 5C is another side view (as in FIG. 2) of the hub-less wheel as observed while traveling on an uneven surface.

As shown in FIGS. 5A-5C, while the tire follows the contour of an uneven road 198, the shock absorber unit 107, and consequently the vehicle which it is riding on, maintains a substantially level traveling line 197. Of course, the spring 213 supporting shock absorber unit 107 extends or compresses as needed, and thereby creates the dampening forces.

Figure 10A:
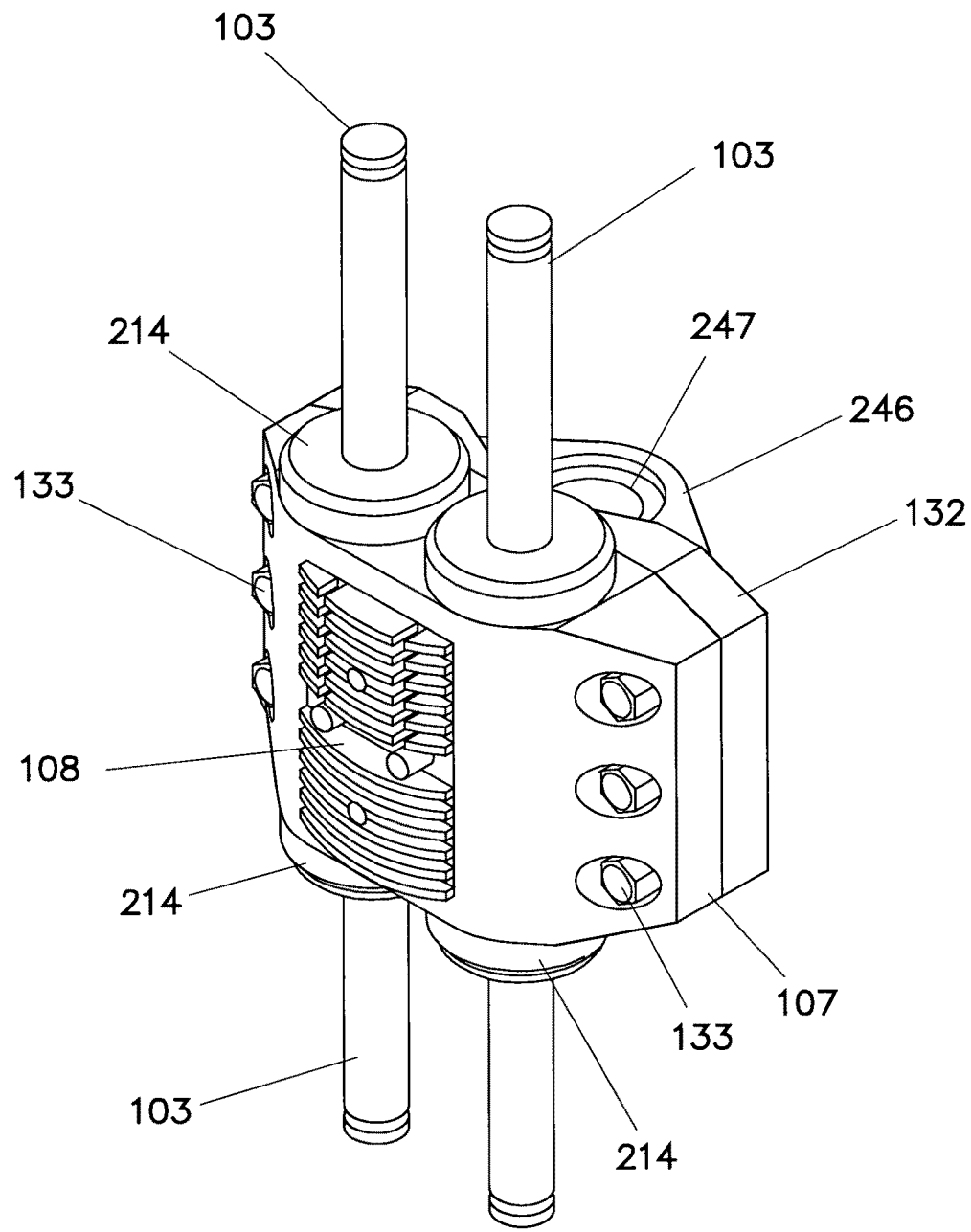
FIG. 10A is a perspective view of parts of the suspension system according to a second embodiment of the present invention.
Figure 10B:
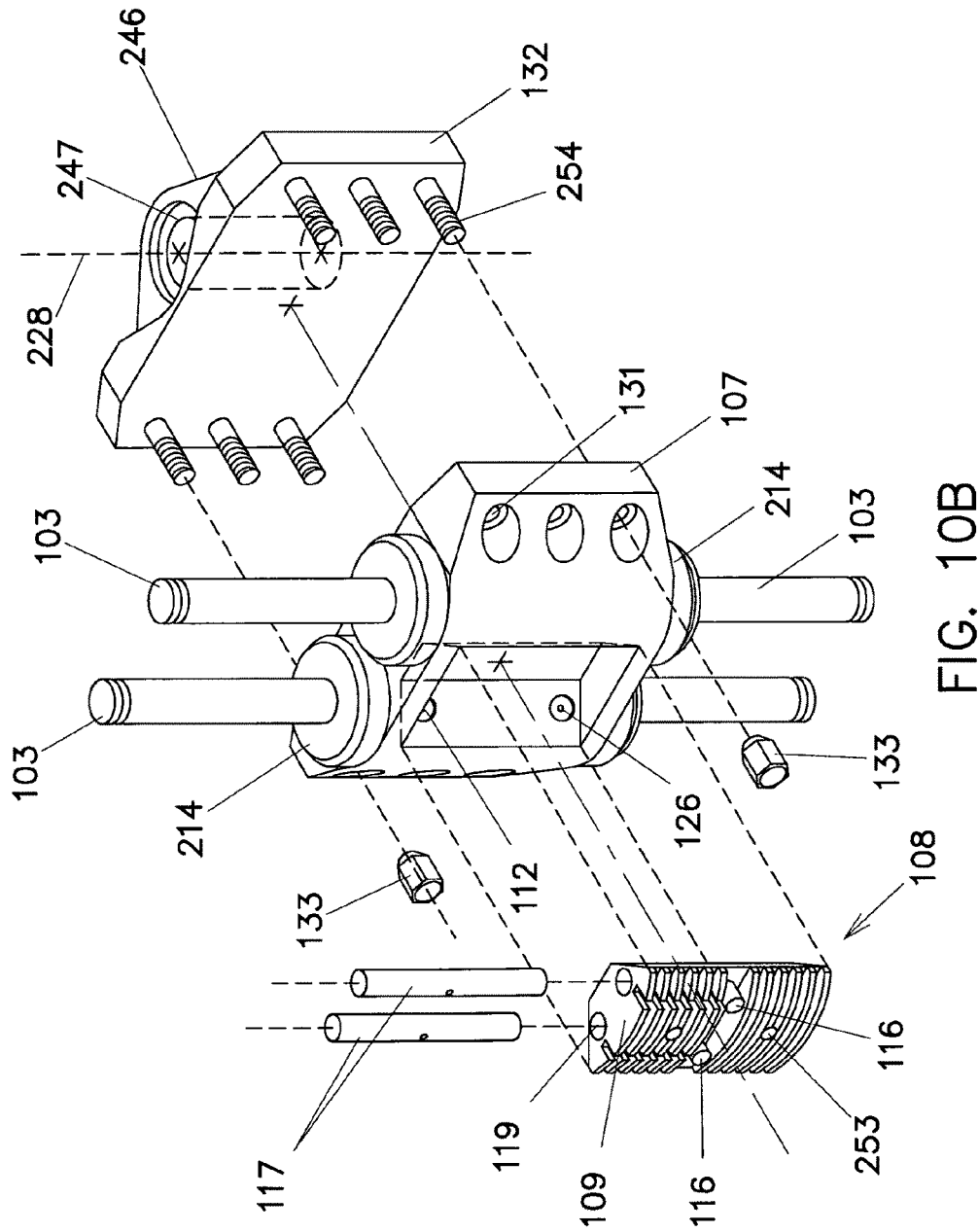
FIG. 10B is another perspective view of parts of the suspension system according to a second embodiment of the present invention.

The part of suspension system including and surrounding the shock absorber unit, i.e. the part enclosed by lines A-A of FIG. 1, is shown in FIGS. 10A-10B in accordance with the first embodiment of the present invention. The vertical guides 103 run through the shock absorber unit 107. Two caps 214 are provided for each vertical guide 103, each one securing a corresponding side of the vertical guide to the shock absorber unit 107. The springs 213 are omitted from FIG. 10 for simplicity.

As seen in FIGS. 31A-31E the caps 214 are screwed onto the shock absorber unit 107. Seals 220 are further provided between caps 214 and vertical guide 103. The seals can be manufactured using any suitable and conventionally available material, preferably metal, and most preferably brass. The section of the vertical guide 103 sandwiched between a top cap and the corresponding bottom cap is enclosed by cavity 219 formed within the shock absorber unit 107. The cavity 219 is a cylinder and is filled with a liquid such as oil as known in the art for shock absorbers. As shown in FIG. 31C the surface 215 faces and surround vertical guide 103. The seals 220, sandwiched between the surface 215 and the vertical guide 103 create a tight seal between the caps 214 and a vertical guide 103 while allowing the caps 214 and a shock absorber unit 107 to slide up and down along a vertical guide 103 as a single unit. Means are provided on the seal 220 and/or the surface 215 to prevent relative motion between the two. One example of such means is at least one circular protrusion on the seal and one matching circular depression in the surface 214. Of course the reverse arrangement can be made to achieve substantially the same purpose. Surface 216 functions to secure the cap 214 to the shock absorber unit 107 through a fixing means. One example of the fixing means is the thread on the surface 216 and the matching thread on the matching surface of the shock absorber unit 107 as shown in FIG. 31C. A ring-shaped piston 218 is provided for and rigidly attached to each of the vertical guides 103 (surrounds it). The piston 218 is divides the cavity into two chambers, upper 234 and lower 235. At least one through-orifice 233 is provided on the piston 218, extending generally in the longitudinal direction of the vertical guide 103, allowing the liquid to flow between the lower chamber 235 and upper chamber 234 of the cavity 219 as separated by the piston 218. A preferred location for the piston 218 is approximately at the mid-point of the vertical guide 103. At least one seal ring 232 is provided for and surrounds each piston 217 as shown in FIG. 31A-31B. The seal ring 232 can be manufactured using any suitable material, preferably a polymeric material used in conventional shock absorbers. Piston 218 plays the same function as a piston in conventional shock absorbers.

Figure 2:
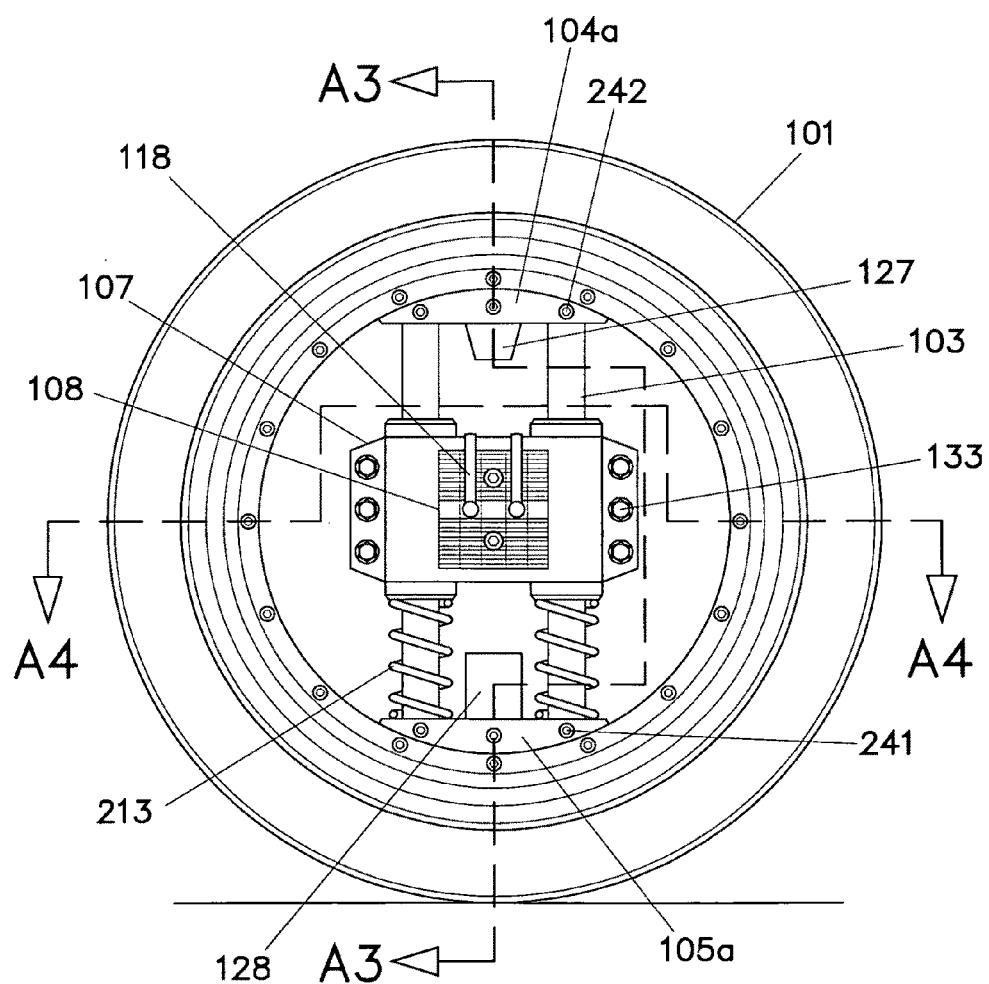
FIG. 2 is a side view of the hub-less wheel of FIG. 1.
Figure 3:
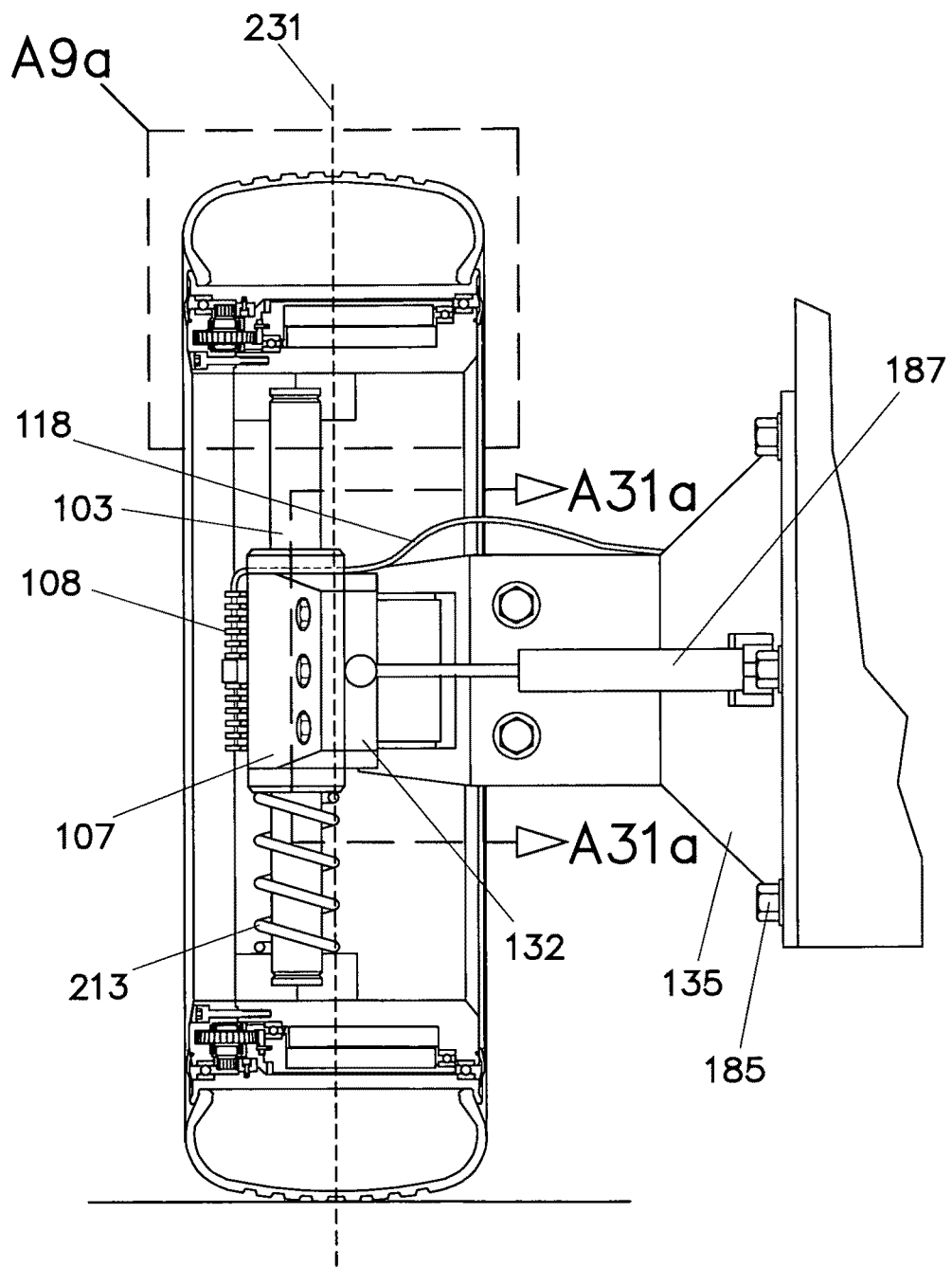
FIG. 3 is a cross-sectional view of the hub-less wheel taken along the bent line A3-A3 of FIG. 2, leaving the suspension assembly intact.
Figure 32:
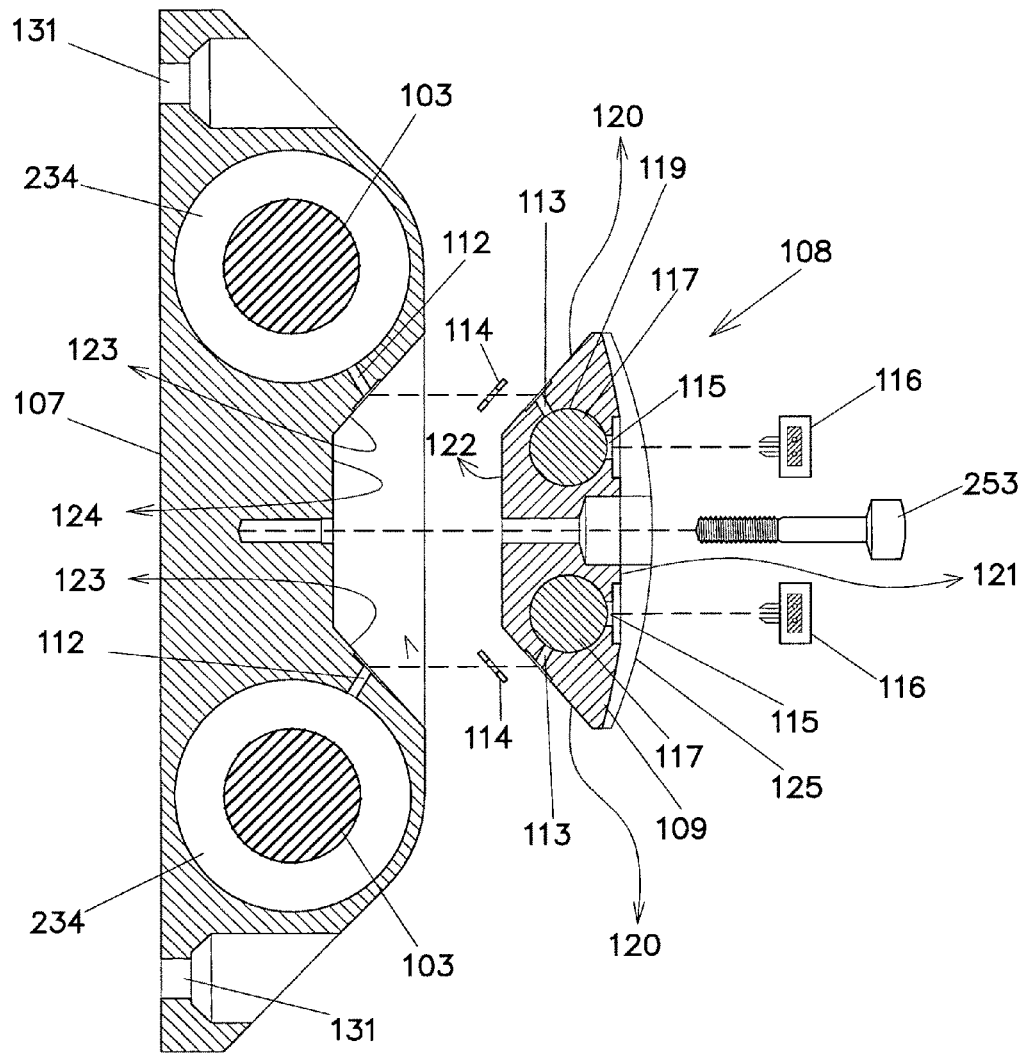
FIG. 32 is a cross-sectional view (exploded) of the part 107 shown in FIG. 8 taken along the line A32-A32.

Additional ride comfort control unit 108 can be installed on the shock absorber unit 107 as shown in FIGS. 1-4, FIGS. 10A-10B and in FIG. 32, which can control ride comfort. As shown in FIG. 32 ride comfort control unit 109 comprises body 109, which has its surface 120 facing the surface 123 of the shock absorber unit 107, has surface 107q facing surface 124 of the shock absorber unit 107. The unit 108 has surface 121 which faces away from the shock absorber unit 107. Fins 125 are located (horizontally) on surface 121 to cool down unit 108 and oil which runs through it. The body 109 of the unit 108 has two through-orifices 119, which run vertically through it. The electronically controlled hydraulic valve 117 is placed into through orifice 119. The plug 116 is connected to the valve 117 through orifice 115 (running through from surface 121 to through-orifice 119) and delivers electrical signal from on-board computing system to the valve 117 by means of the wire 118 as shown in FIG. 3 and FIG. 32. As shown in FIG. 10B, FIG. 31A and FIG. 32 the shock absorber unit 107 has through-orifices 112 (upper) and 110 (lower). Ride comfort unit 108 has through-orifices 113 (upper) and 126 (lower) matching (in size and location) through-orifices 112 and 110 on shock absorber unit 107. Through-orifice 113 connects the upper section of the through-orifice 119 with surface 120 and through-orifice 126 connects the lower section of the through-orifice 119 with surface 120.

The through-orifice 112 connects cavity 234 with the upper section of the surface 123, and the through-orifice 110 connects cavity 235 with the lower section of the surface 123.

As shown in FIG. 32 seal 114 is sandwiched between shock absorber unit 107 and ride comfort unit 108, and insures tighter seal in-between.

Figure 33:
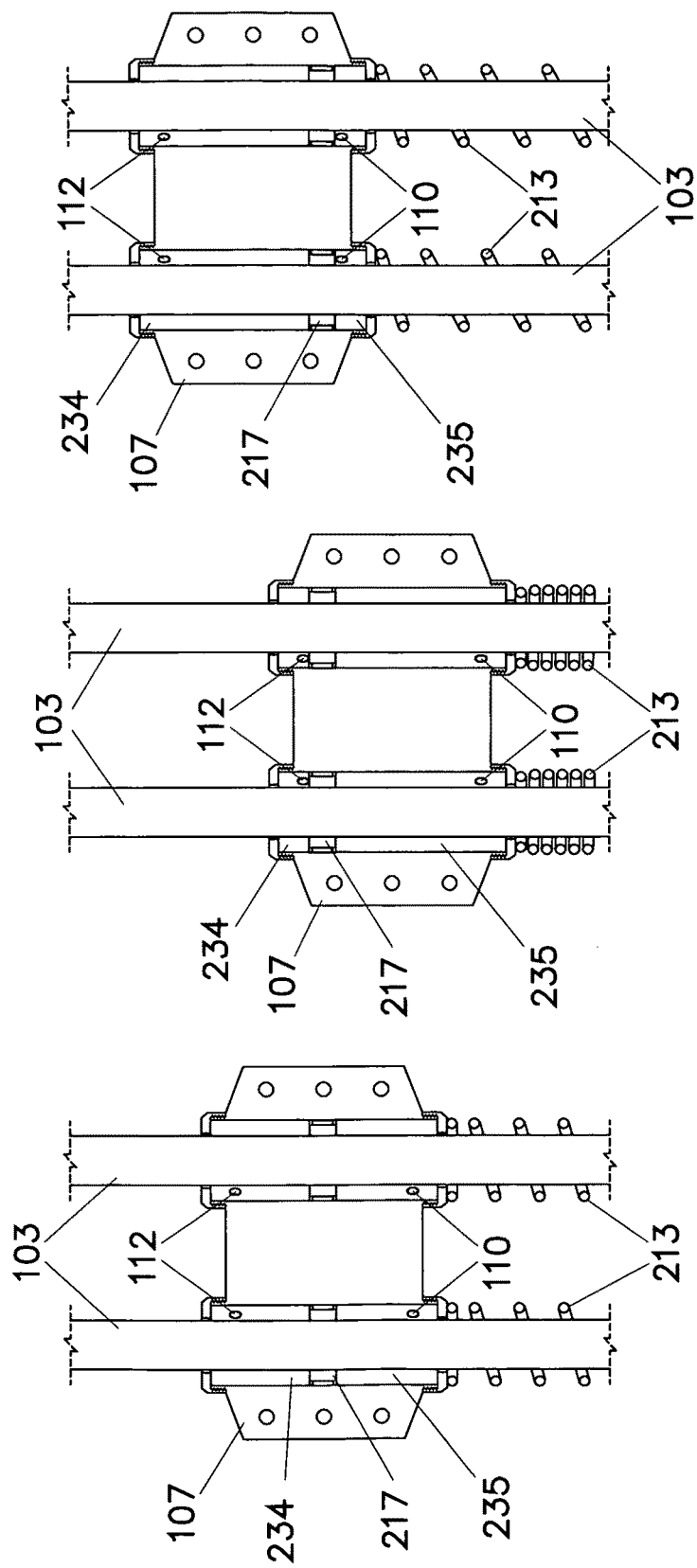
FIG. 33A is a side view of the vehicle suspension system with part 107 cut for better viewing of internal functions while the vehicle is traveling on an uneven surface.
FIG. 33B is another side view of the vehicle suspension system with part 107 cut for better viewing of internal functions while the vehicle is traveling on an uneven surface.
FIG. 33C is another side view of the vehicle suspension system with part 107 cut for better viewing of internal functions while the vehicle is traveling on an uneven surface.

FIGS. 33A-33C show how the ride comfort unit functions. When the wheel is traveling over an uneven surface (over a bump as seen in FIG. 5B), the wheel assembly and attached to it vertical guides 103 are traveling up relative to the shock absorber unit 107. In result of this movement, piston 218, which is rigidly attached to the vertical guide 103, travels upward pressurizing oil against upper cap 214. Pressurized oil escapes through through-orifice 112 and through aligned with it, through-orifice 113, into the electronically controlled valve 117 located in cavity 119 of the unit 108. Oil then passes through the hydraulic valve 117, which is controlled by an on-board computing system, into the cavity 183b through through-orifice 126 of the unit 108 and aligned with it through-orifice 110. Ride comfort (soft or stiff suspension) can be controlled by controlling flow (amount in period of time) of oil by means of hydraulic valve 117 from chamber 234 to chamber 235 or backwards. As a result of such pressure and friction that the oil molecules are experiencing, the oil heats up and loses its physical properties. The unit 108 has the fins 125 which play same role as fins on conventional radiators used in any other industry to cool down oil temperature.

As a low cost alternative, shock absorber unit 126 can be used as a shock absorber which works similar to conventional shock absorbers (oil travels from chamber 234 to chamber 235 and back through through-orifice 233) as shown in FIG. 31B. FIGS. 11A and 11B are an alternative embodiment 224 of the part of the suspension system capable of replacing the part described in FIG. 10A. This alternative embodiment is simpler in structure and cheaper to produce. It is noted that the steering knuckle 132 is omitted from FIG. 11A for clarity and would preferably be included during installation, but holes 223 for attaching the bolt to the knuckle are provided. In this simplified design the vertical guides are not enclosed in a cylindrical cavity formed in the shock absorber unit. Rather, a cylindrical shell 223, whose inner wall can be considered equivalent in structure and function to the inner wall of the cylindrical cavity 219 of FIGS. 31A-31B, is provided to enclose a section of the vertical guides 103. The structure in accordance with this embodiment comprises a bracket 221 and two shells 223 as shown in FIG. 11B with the shells removed from the bracket and in FIG. 11A in an assembled form. The bracket 221 possesses a U-shaped cross-section both horizontally and vertically as shown in FIG. 11A. The vertical U-shaped cross-section is formed by the back plate 236 and two opposing plates, the top plate 237 and the bottom plate 238. Multiple holes 131 provided on the back plate 236 to attach shock absorber unit 224 to the steering knuckle 132. At least one pair of through holes 222 are provided on each of the two opposing plates (237 and 238). The matching holes 222 on the two opposing plates accommodate the shells 223 and the shells 223 are welded to the bracket 221 at the perimeter of the holes 222. The horizontal U-shaped cross-section is formed by the back plate 236 and the two opposing plates 239 and 240.

FIG. 2 shows the bumpers 127 and 128. Bumper 127 is fixed to the upper bracket assembly 104 and bumper 128 is fixed to the bracket assembly 105. FIGS. 5A-5C show how the bumpers 127 and 128 in conjunction with the shock absorber unit 107 defines the maximum upper and lower limits the vertical guide 103 is allowed to travel. FIG. 5A shows the suspension system wherein shock absorber unit 107 is not engaged with either the top bumper 127 or bottom bumper 128. Such is the case when the vehicle has been traveling on a leveled surface and the springs 213 are lightly or moderately compressed. FIG. 5B shows wherein the vertical guides 103 and the wheel travel upward to the extreme position relative to the shock absorber unit 107. The top surface of the bumper 128 is in contact with the bottom surface of the shock absorber unit 107 and prevents further upward travel of the guides 103 and the wheel. Such is the case when the suspension system responds to significant upward curvature in the contour of the road surface, and the springs 213 are more compressed compared to the scenario shown in FIG. 5A. If the upward curvature is less than a certain threshold value (which is defined by the weight of the vehicle including the loads carried, the force constant of the springs 213 and other measurable parameters known to an artisan), the bumper attached to the bracket 105 will travel upwardly but will fail to reach the bottom surface of the shock absorber unit 107. In FIG. 5C there is shown the vertical guide 103 and the wheel traveling downwardly to the extreme position relative to the shock absorber unit 107. The bottom surface of the upper bumper 127 is in contact with the upper surface of the shock absorber unit 107 and prevents the bracket 104 and the vertical guide 103 rigidly fixed thereto from traveling further downward. Such is the case when the suspension system responds to a significant downward curvature in the contour of the road surface, and the springs 213 are less compressed or even extend beyond their natural state compared to the scenario shown in FIG. 5A. If the downward curvature is less than a certain threshold value (which is defined by the weight of the vehicle including the loads carried, the force constant of the springs 213 and other measurable parameters known to an artisan), the bumper 127 attached to the bracket assembly 104 will travel downward but will fail to reach the top of the shock absorber unit 107.

However, it is noted that the bumpers 127, 128, and shock absorber unit 107 are the sole determining factors in setting the range of travel of the vertical guide 103 only when the springs 213 do not exert a significant influence. When the force constant is beyond a threshold value, the force exerted by the compression or extension of the springs 213 can be sufficient to counteract the force due to the vehicle and the load. In this scenario, the springs 213 effectively set the actual travel limit of the vertical guides 103. The shock absorber unit 107 will not be able to reach the bumpers 127 and 128.

Bumpers 127 and 128 preferably made of an elastomeric material such as rubber, are preferably provided on the exposed surface of the mounting bracket assemblies 104 and 105 (FIG. 2) or can be fixed to the top and bottom surfaces of the shock absorber unit 107, preferably between the two vertical guides 103.

Figure 4:
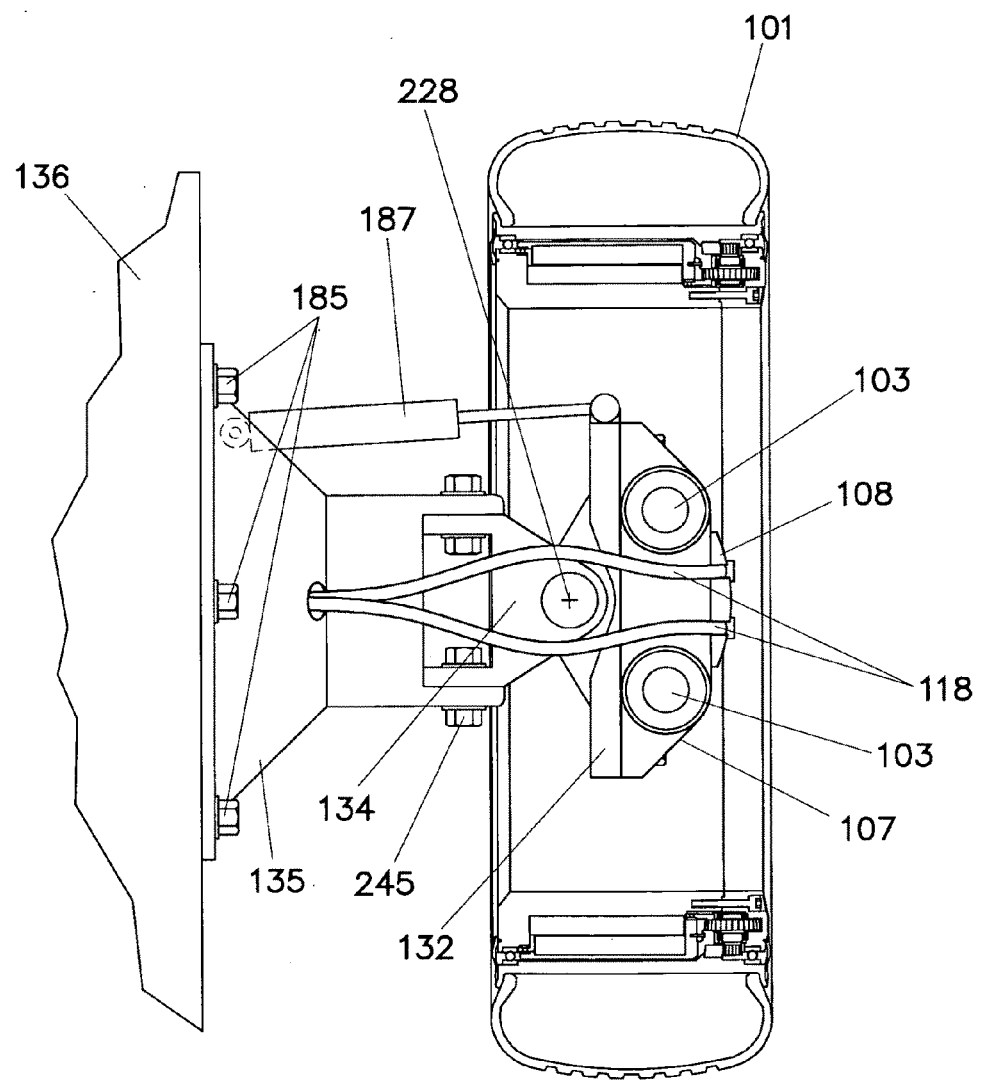
FIG. 4 is a cross-sectional view of the hub-less wheel taken along the bent line A4-A4 of FIG. 2.

As shown in FIGS. 1, 3, 4, etc., the vehicle mounting assembly comprises a steering knuckle 132, first coupling bracket 134 and a second coupling bracket 135.

The stirring knuckle 132 is attaches to the shock absorber unit 107 as shown in FIG. 1 and can be attached in the fashion to the simplified mounting frame 224 shown in FIG. 11A, respectively.

Figure 6:
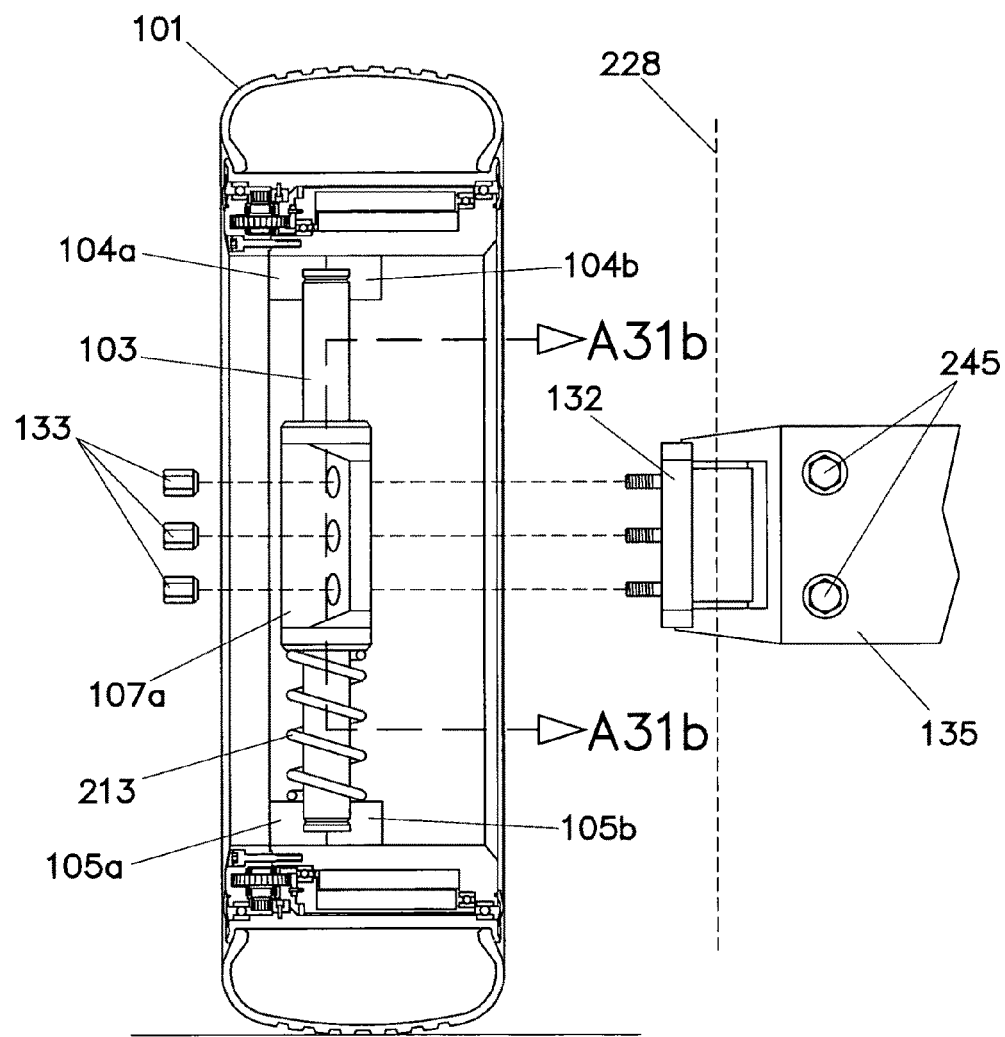
FIG. 6 is a cross-sectional view of the hub-less wheel taken along the bent line A3-A3 of FIG. 2 when removed from the vehicle.
Figure 7:
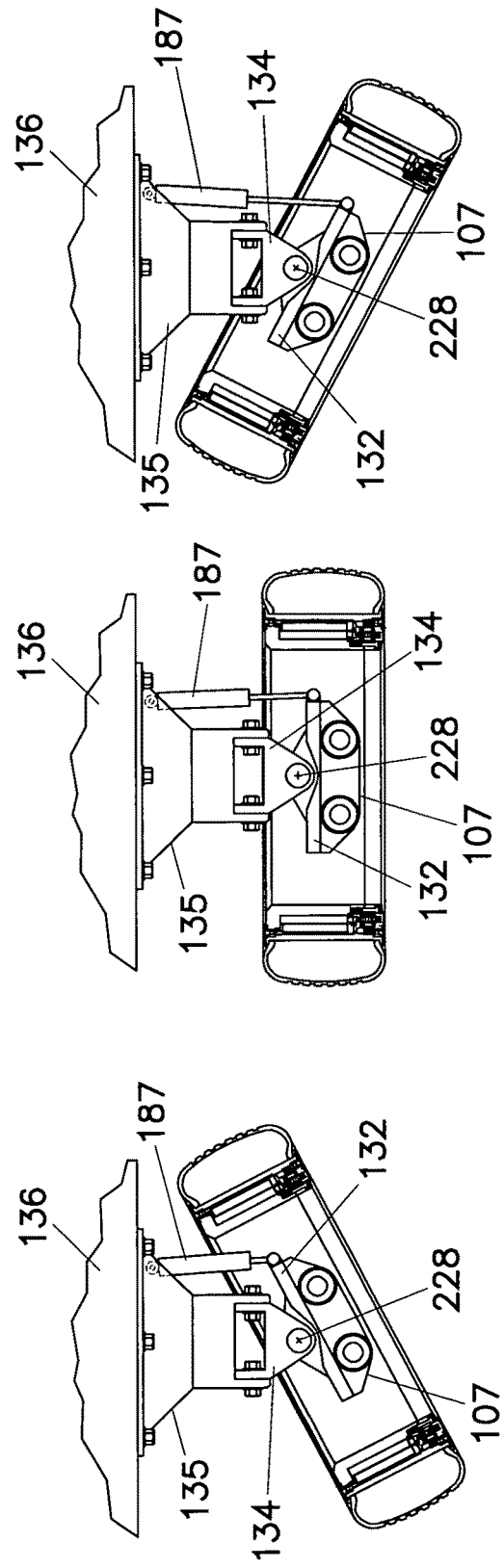
FIG. 7A is a representation of FIG. 4 at a rotational angle at the pivotal point.
FIG. 7B is a representation of FIG. 4 at a rotational angle at the pivotal point.
FIG. 7C is a representation of FIG. 4 at a rotational angle at the pivotal point.

The components of the assembly (the steering knuckle 132, the first bracket 134 and the second bracket 135) are designed so that the steering axis goes through a contact patch of the tire 101 or slightly in front of the contact patch of the steerable wheel (see, for example, FIGS. 3, 4, 6 7A-7C, 18, 22, 26A-26B, and 28A-28B) by positioning the pivot point 228 (as shown in FIGS. 7A-7C) of the steering knuckle inside the rim space of the wheel.

Figure 16:
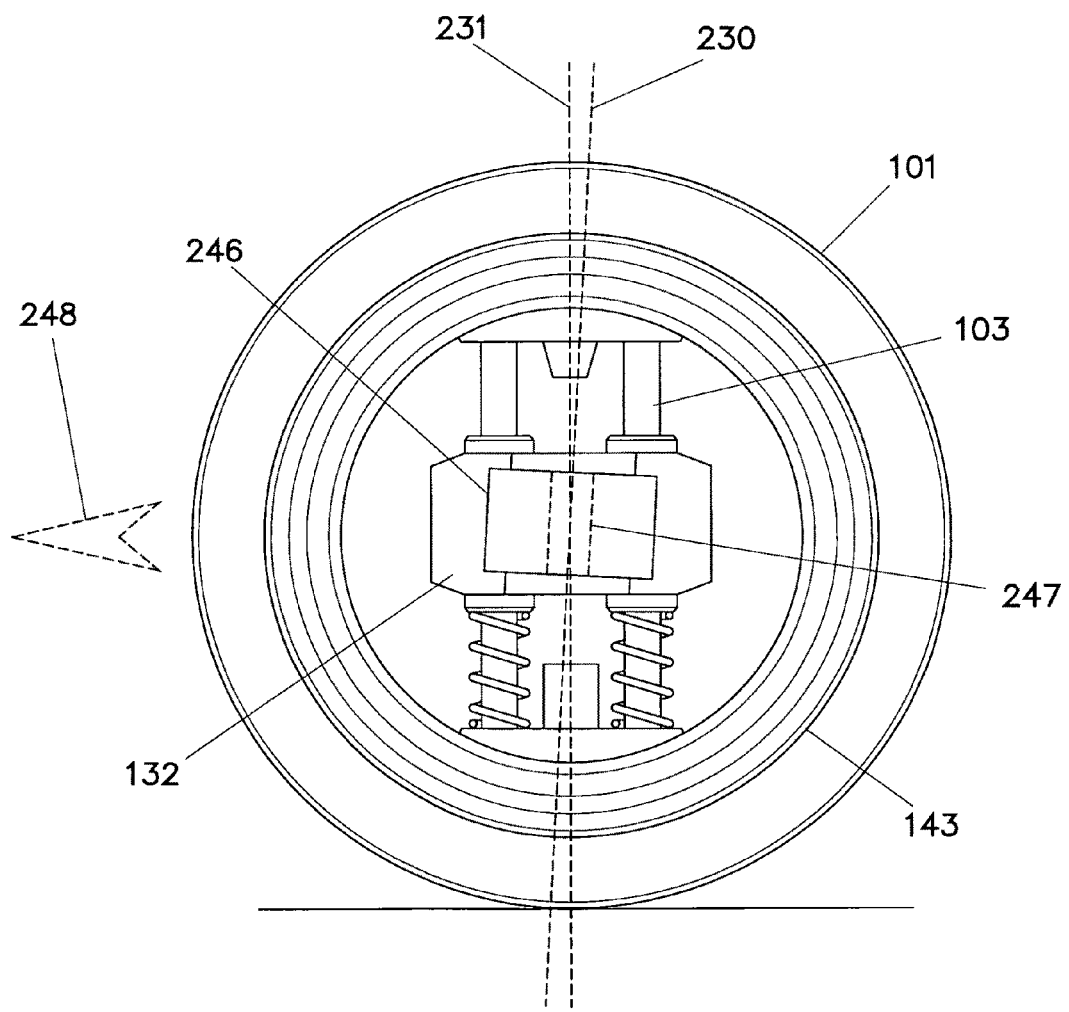
FIG. 16 is an opposite view of FIG. 15 showing fixed castor angle.

As shown in FIG. 16, the steering knuckle is designed in a way that it has a positive castor represented by line 194a. Steering knuckle 132 has a protrusion 246 it is set on a slight angle (optimal angle is set for better performance). Protrusion 246 has a through-orifice 247 running from top to bottom and it is parallel to the lines of the protrusion 246, and is set on the same angle regarding steering knuckle 132. In FIG. 16 arrow 248 shows direction of the vehicle (front).

Hub-Less Rim

Figure 22:
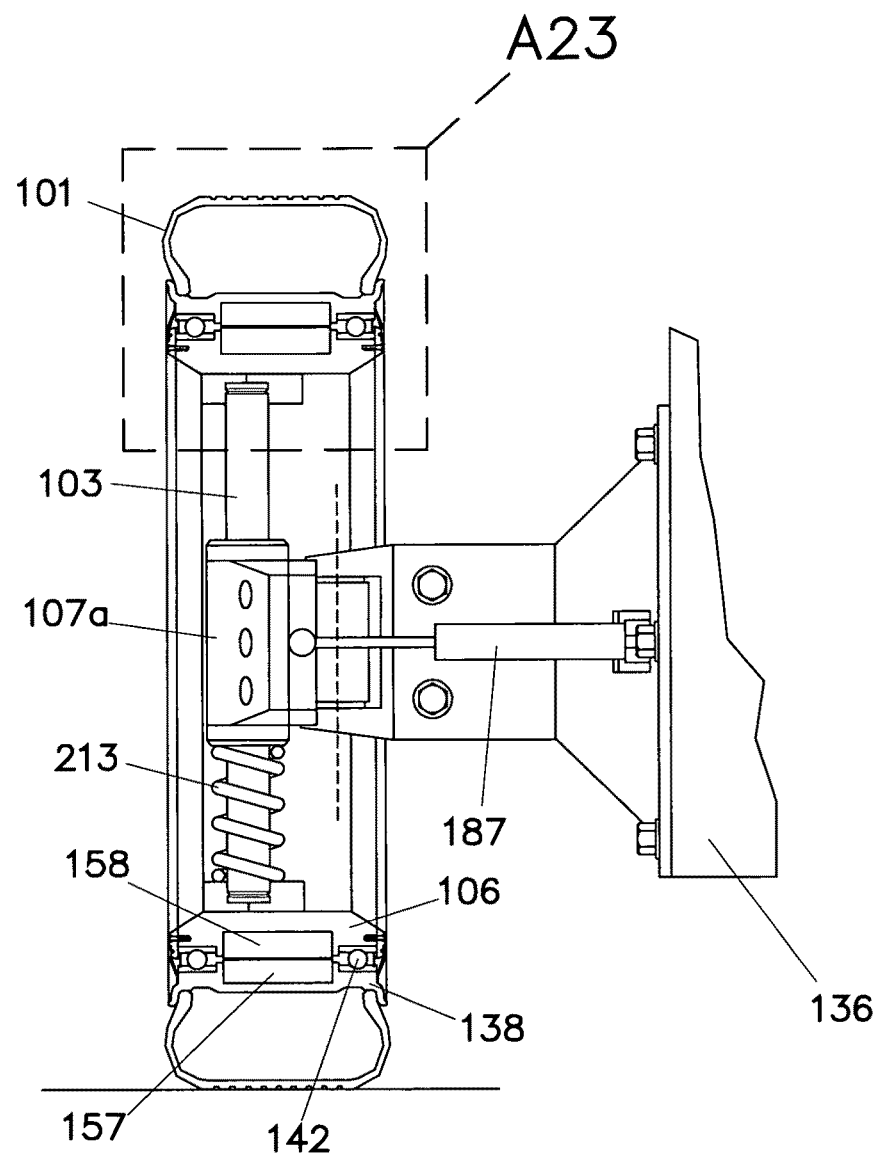
FIG. 22 is a front view of the suspension system with hub-less wheel 102 cut-out for better visibility.
Figure 23:
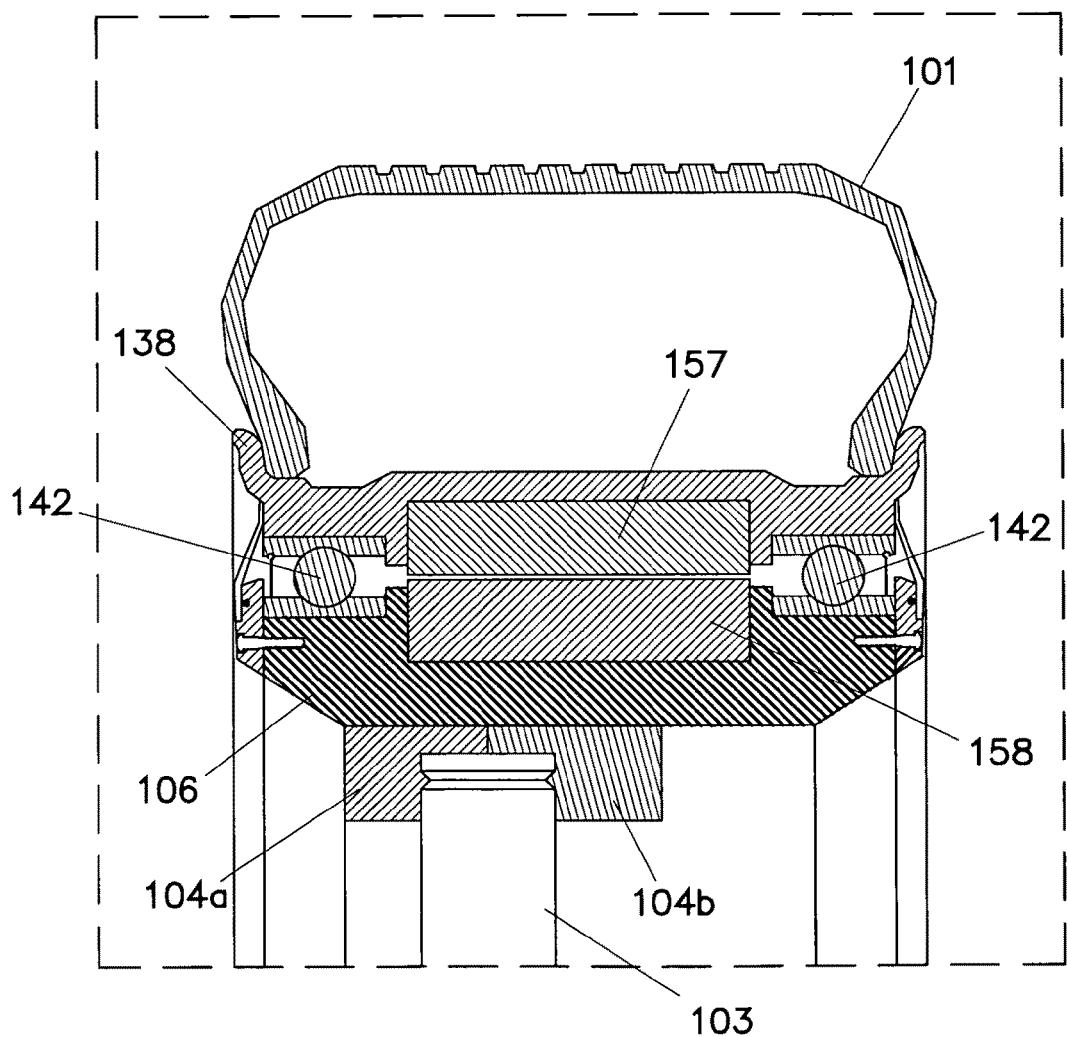
FIG. 23 is an expanded view of the rectangle-shaped area A23 of FIG. 22.

The in-the-wheel suspension system described above is attached to a hub-less rim of the wheel. As shown in FIGS. 1, 22, and 23, the hub-less rim assembly 102 comprises at least two rings, e.g., an inner ring 106 and an outer ring 138. The inner ring 106 is the stationary part of the assembly and is mounted on the suspension systems vertical guides 103 and houses the stator part 158 of an electric motor. The outer ring 138 holds the tire 101 and moving (rotary) part 157 of the electric motor. In use, the outer ring 138 rotates round its virtual axis relative to the inner ring 106, preferably by means of ball bearings 142 placed there between as shown in FIGS. 1, 22, and 23.

Figure 9A:
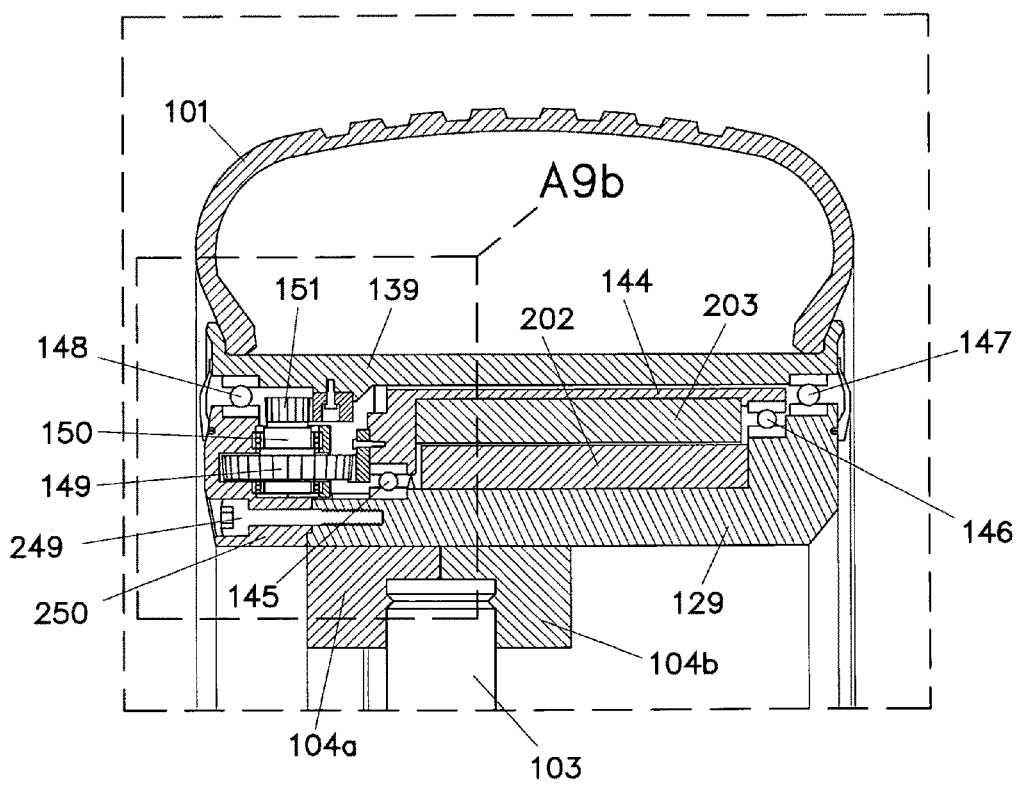
FIG. 9A is a cross-sectional view of the wheel embodying a three-ring hub-less rim.

Shown in FIG. 9A is an alternative embodiment of the hub-less rim comprising three rings.

The first ring is the inner (stationary) ring 129, to which the suspension system is attached from inside and houses the electric motor's stator element 202. As shown in FIGS. 1 and 2, regardless of the number of rings present in the hub-less rim, preferably the suspension system is attached to the inner ring through two mounting bracket assemblies 104 and 105. The mounting brackets 104b and 105b are provided and rigidly attached to the diametrically opposing sides on the inner surface of the inner ring. The brackets 104b and 105b can be welded to the inner ring 106 or attached using conventional means, such as by bolts and nuts using holes 241 and 242 provided on the brackets. The brackets 104a, 104b, 105a, and 105b further have means 243 and 244 for rigidly mounting the vertical guides 103. In one embodiment, the means 243 and 244 are depressions that match termini of the vertical guides both in size and shape. The length of the vertical guides 103 is designed to be equal to the distance between the bottom of the depression 243 in one bracket and the bottom of the matching depression 244 in the other bracket. Therefore, when the vertical guides, along with the shock absorber unit 107 and the springs 213 attached thereto, are mounted between the bracket assemblies 104 and 105, both ends of each of the vertical guides 103 extend into the depression (243 and 244), thereby mounting the suspension system in the inner ring. Preferably, at list one circular depression (or protrusion) is provided close to the terminus of the vertical guide and correspondingly at least one matching circular protrusion (or depression) is provided in 243 and 244, allowing the end of the vertical guide and the bracket assemblies 104 and 105 to lock into a secure connection. As described above, bumpers 127 and 128 are provided on the external surface of the bracket assemblies 104 and 105 (FIG. 2).

The second ring is the middle ring 144, which houses and represents the moving (rotary) part 203 of the electrical motor and is connected to the inner ring 129, preferably through two ball bearings 145 and 146 (more ball bearings generally lead to better stability), and rotates around its virtual axis.

The outer ring 139, on which tire 101 is mounted, represents the propulsion part of the hub-less rim assembly 143 and is connected to the inner ring 129, preferably by means of a two ball bearings, such as 147 and 148 as illustrated in FIG. 9A.

Figure 9B:
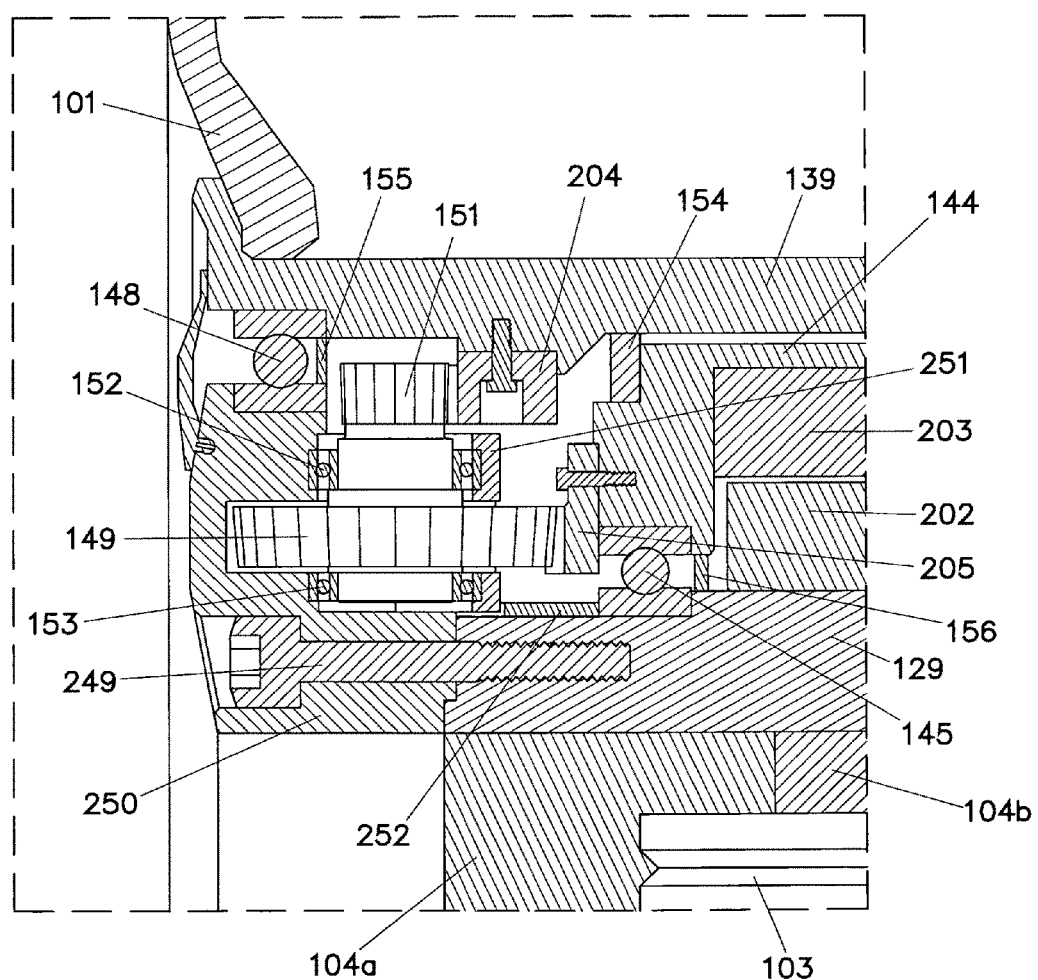
FIG. 9B is an expanded view of the rectangle-shaped area A9a of FIG. 3.
Figure 34:
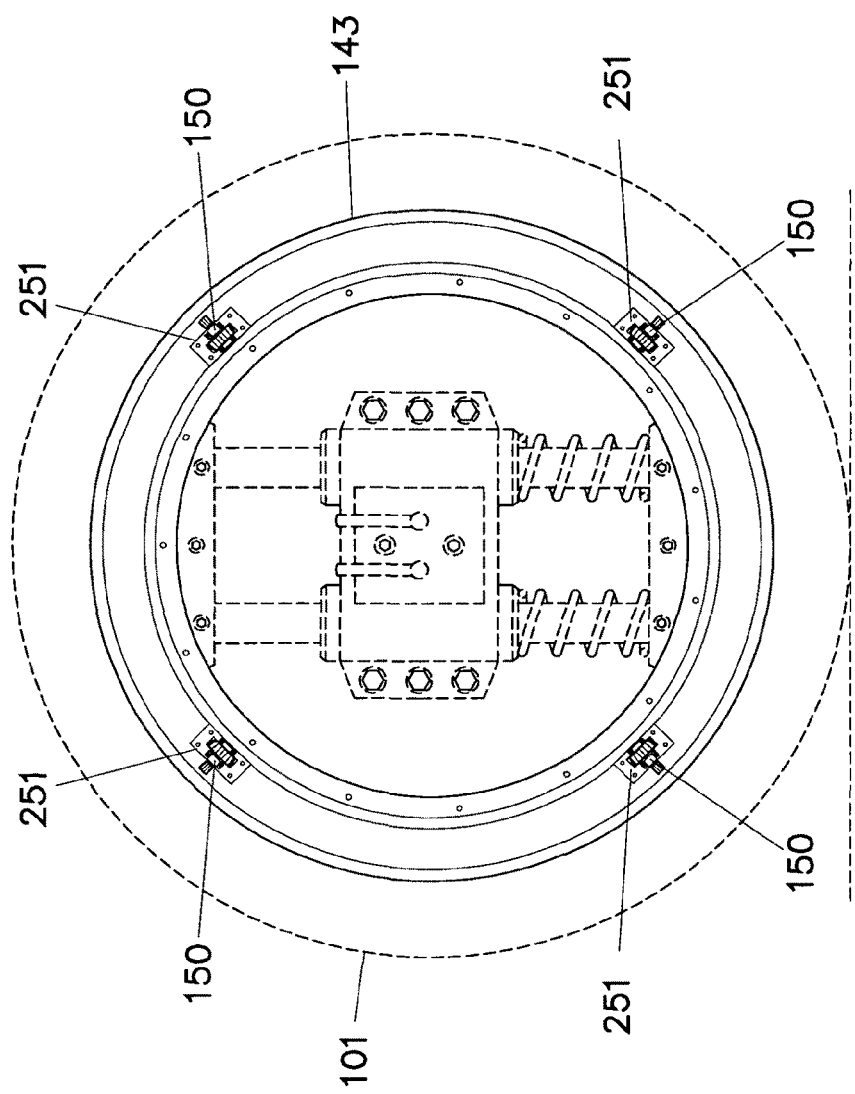
FIG. 34 is a side view of the parts 150 and 251 with the hub-less wheel and suspension system shown as phantom line for better visibility.

FIG. 9B provides an expanded view of the area A9a shown in FIG. 9A, enabling a close inspection. Mounted on the inner ring 125, preferably through at least two ball bearing 152 and 153, is a gear assembly 150, which comprises a large diameter gear 149 and a small diameter gear 151 with a displacement there between long the radial direction of the wheel, the two gears 149 and 151 sharing a common shaft. FIG. 34 shows location and position of the gear assembly 150 relative to the wheel rotational axis. As shown in FIG. 9B, the large diameter gear 149 is located radially internal to the small diameter gear 151. As noted above, during use, the middle ring 144 (the rotary part of the electric motor) spins around the inner (stationary) ring 129 and the gear assembly 150 is responsible for transmitting and downshifting the rotational motion from the middle ring 144 to the outer ring 139. In the embodiment shown in FIG. 9B a gear 205 is provided, rigidly mounted on the middle ring 120 and is in contact with the gear 149 of the gear assembly 150. Similarly, a gear 204 is provided, rigidly mounted on the outer ring 139 and is in contact with the gear 151 of the gear assembly 150. Therefore, the rotational motion of the middle ring 144 is first transmitted to the gear assembly 150 through the gear 205, then from the large diameter gear 149 to the small diameter gear 151 within the gear assembly 150, and finally to the outer ring 139 through the gear 204.

As shown in FIG. 9B the gear assembly 150 is positioned in a void formed and surrounded by the inner, middle, and outer rings. The area around the gear assembly 150 is sealed by the seals 154, 155, and 156. The void can be filled with a lubricant, such as motor oil, or any other lubrication substance known in the art, to reduce the friction between the components of the gears.

Motors and Power Transfer System

A motor preferably, an electric motor and most preferably electric step motor comprising a stator part and a rotary part, is provided in the wheel structure.

In a first embodiment, the electric motor is provided in the rim structure. In the embodiment wherein a two-ring hub-less rim is disclosed, as shown in FIGS. 1, 22, and 23, the stator part 158 of an electric step motor is attached to the inner ring 106 and the rotary part 157 of the electric step motor is attached to the a outer ring 138. While a two-ring hub-less ring enjoys the advantage of low cost and simplicity, the step motor may lead to uncomfortable vibrations particularly during low speed and acceleration from the start. If such vibrations are difficult to suppress or eliminate, the three-ring hub-less rim as taught in FIG. 9A can be employed, wherein the stator part 202 of the electric step motor is attached to the inner ring 129 and the rotary part 203 of the electric step motor is attached to the middle ring 144. This embodiment allows higher electric motor speed while maintaining lower rotational speed of the wheel further increasing torque and comfort of the vehicle.

Figure 12:
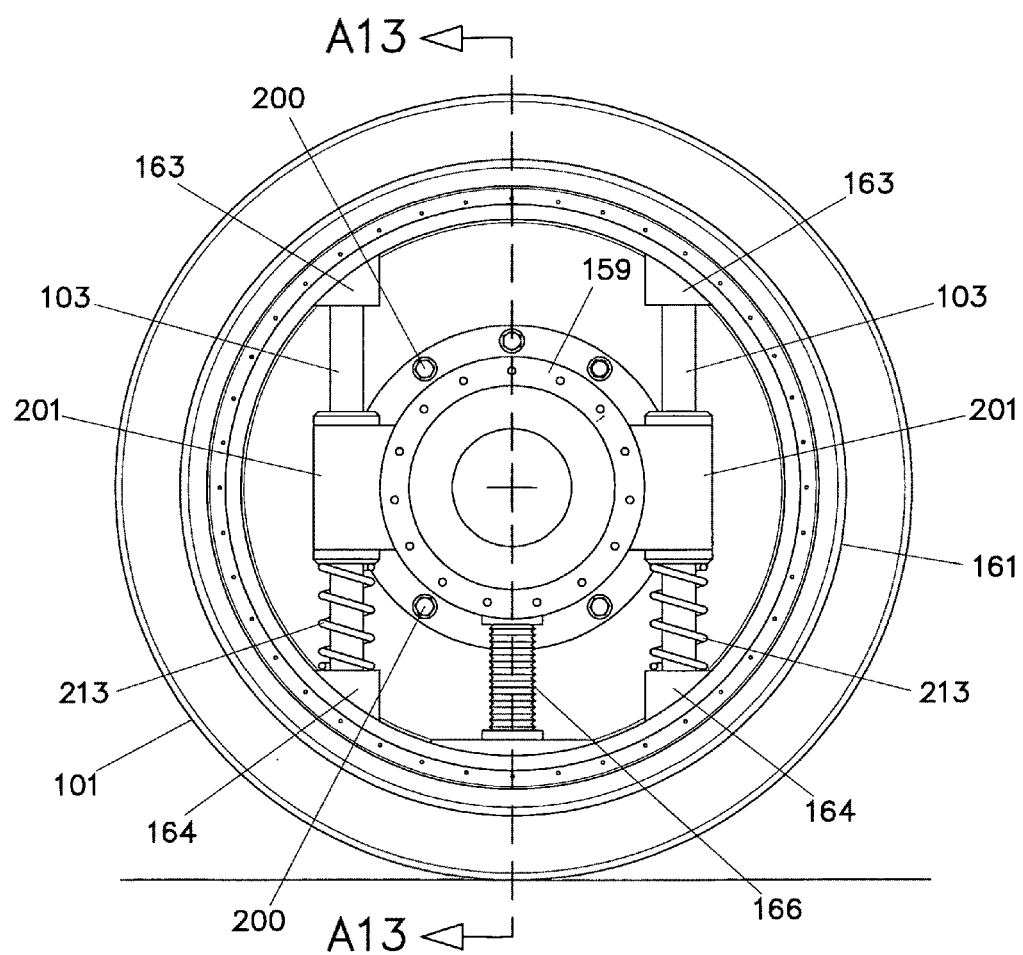
FIG. 12 is a side view of a hub-less wheel comprising an in-the-wheel suspension system in accordance with a first sub-embodiment of a second embodiment of the present invention, wherein the motor is located in the center of the wheel and the power is transferred through a mechanical power transfer system.
Figure 13:
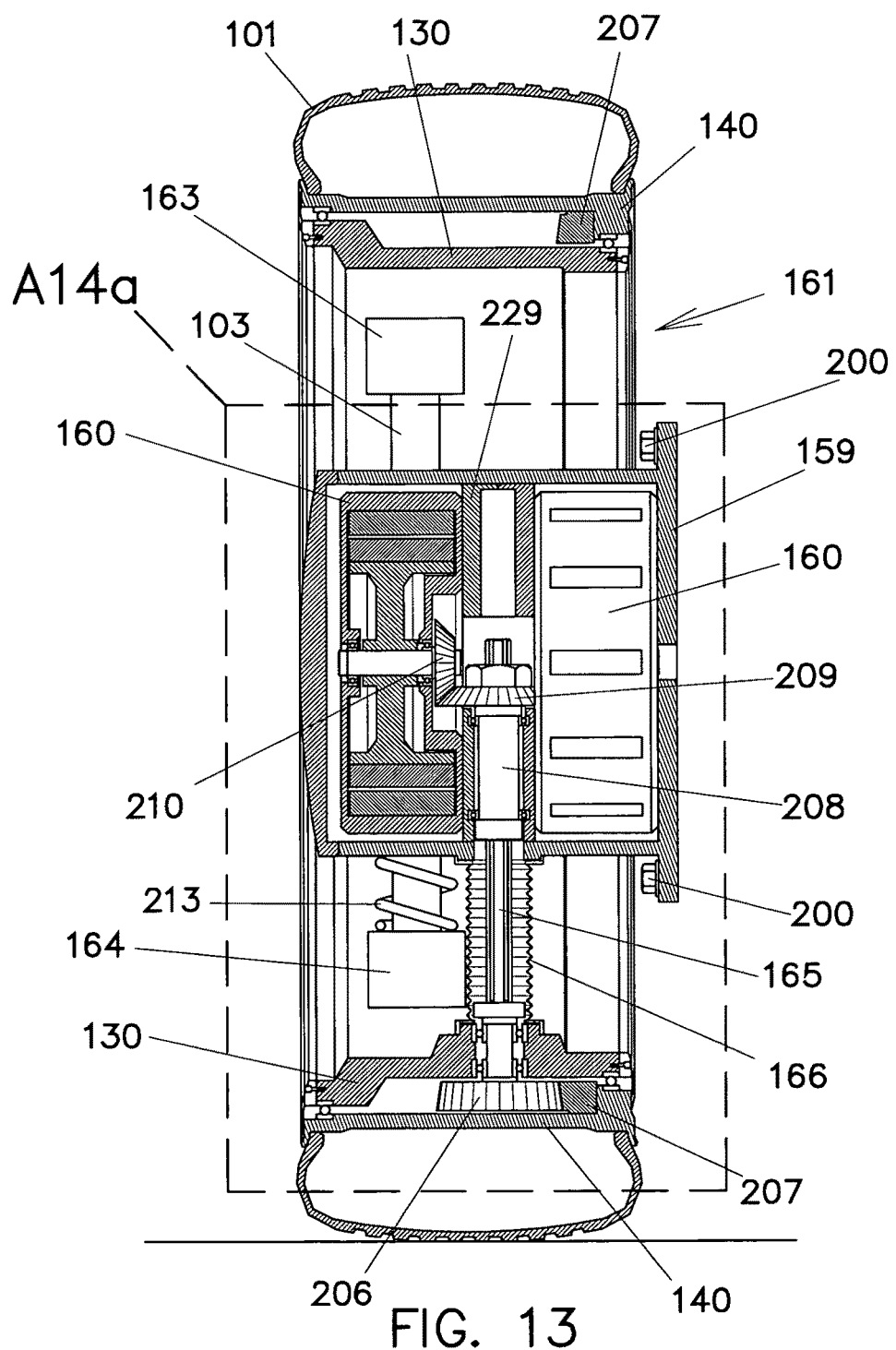
FIG. 13 is a cross-sectional view of the hub-less wheel shown in FIG. 12 taken along the line A13-A13, with the part 160 partially cut out.

In an alternative embodiment, particularly for use on heavy duty vehicles such as trucks and trailers, the electric motor can be placed in the center of the hub-less rim as shown in FIGS. 12, 13, 24A, and 25. A frame 159 is provided and rigidly connected, preferably directly, to the vehicle chassis 136 with a multitude of bolts 200. The frame 159 is placed at least partially inside the space of the hub-less rim assembly 161 and it houses preferably two electric drive-motors 160 (use of one or more than two electric motors is possible) as shown in FIGS. 13, 14A-14B, and 25. A shock absorber unit 201 is provided and rigidly attached (bolted and/or welded) to the frame 159. The shock absorber unit 201 provides for two receptacles located on the opposing sides of the frame 159, each adapted for receiving a suspension system there through. Alternatively, the shock absorber unit can be provided in two separate parts, each part rigidly attached to an opposing side of the unit and adapted for receiving a suspension system therethrough. Similar to the suspension system disclosed above with reference to FIG. 1, the suspension system used in the present embodiment comprises a vertical guide 103 and a spring 213. The vertical guides 103 are connected to the inner ring 130 of the hub-less rim assembly 161 through brackets 163 on one end and the brackets 164 on the other as shown in FIG. 13. The spring 213 is provided between the undersurface of the shock absorber unit 201 and the bracket 164 and encloses a lower portion of the respective vertical guide 103. Shock absorber unit 201 surrounds a portion of vertical guides 103 similar to shock absorber unit 107 creating cavity 219.

Figure 14A:
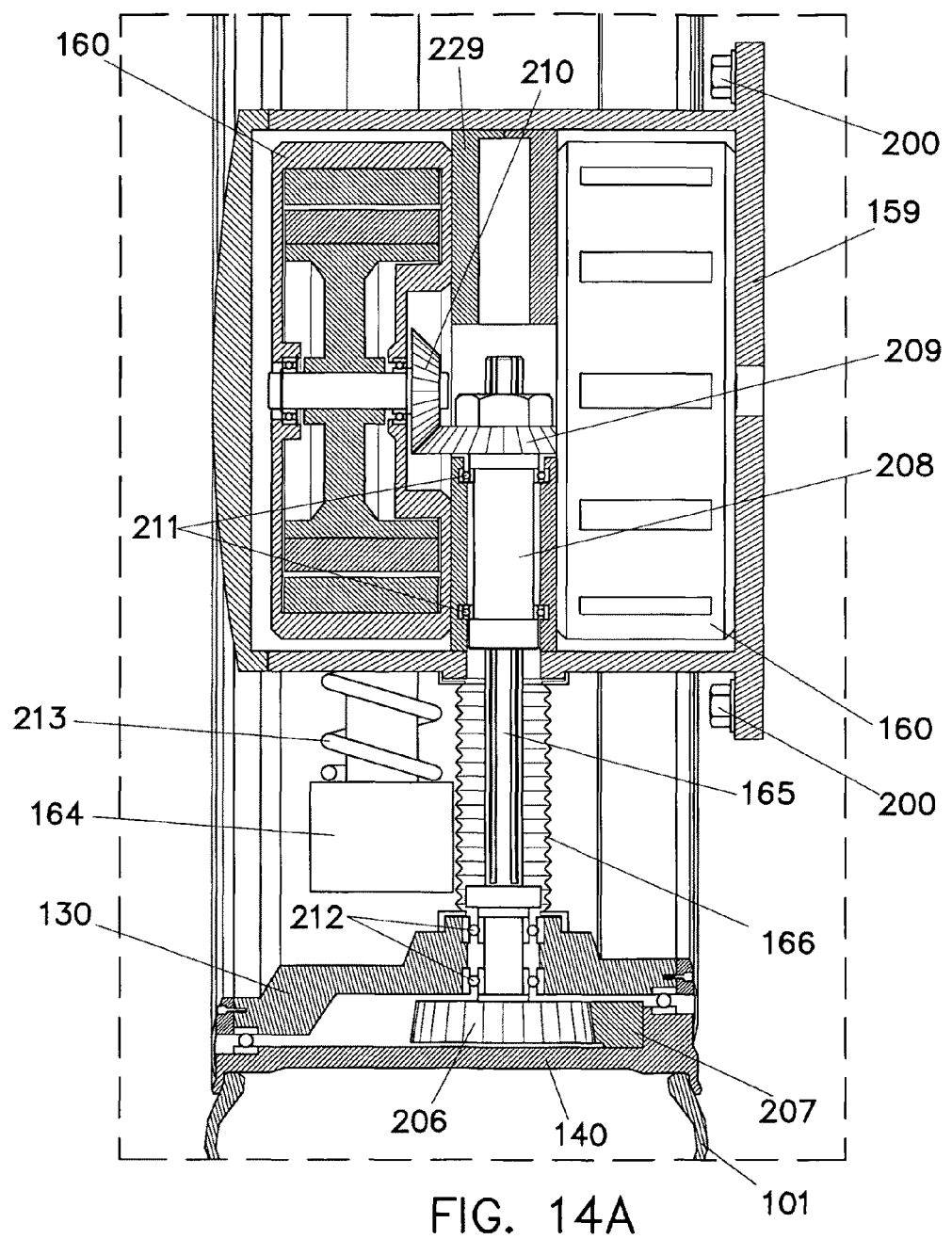
FIG. 14A is an expended view of the rectangle-shaped area A14a of FIG. 13, with the part 160 partially cut-out showing part 165 traveling on uneven surface.
Figure 14B:
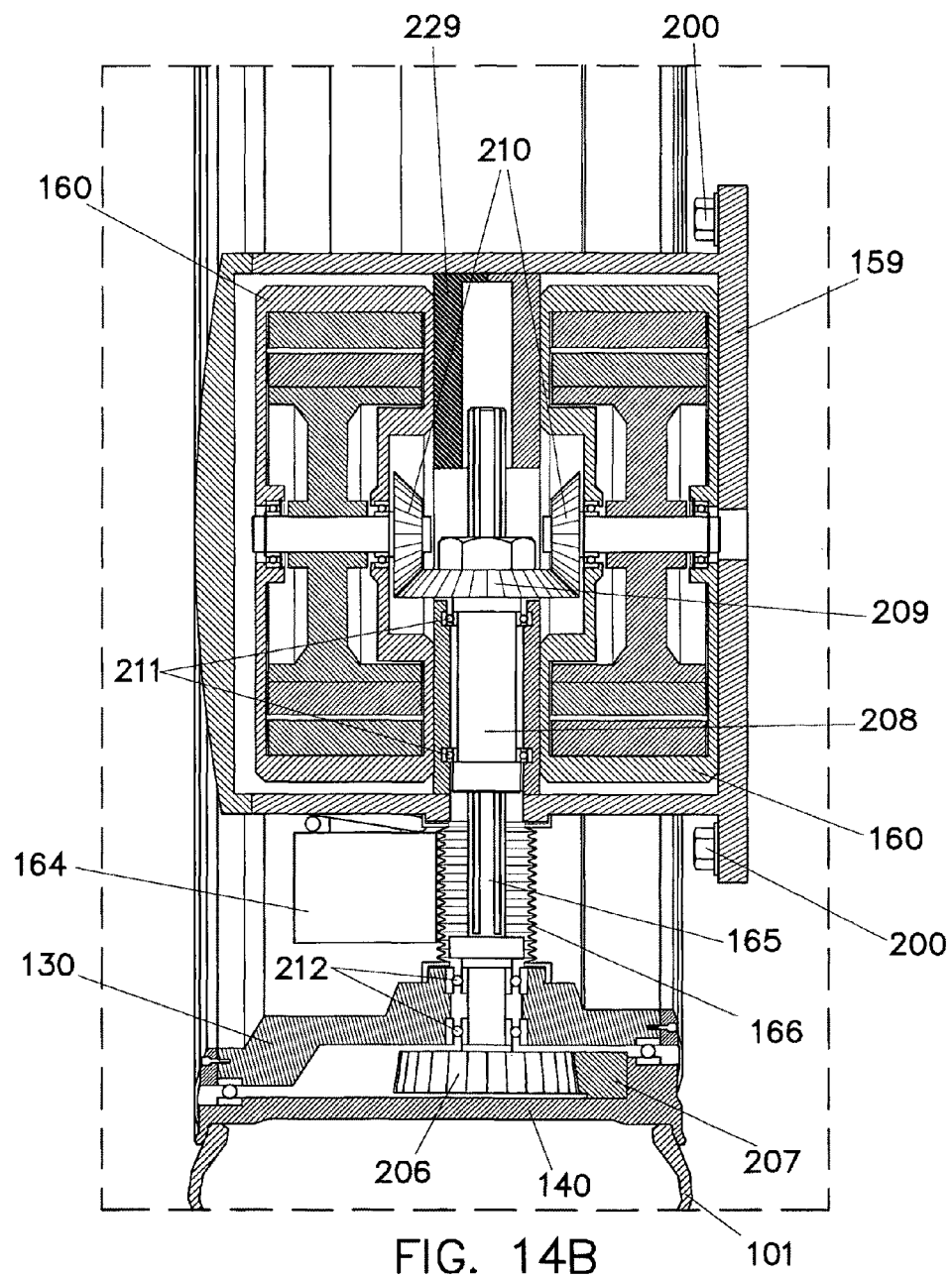
FIG. 14B is an expanded view of the rectangle-shaped area A14a showing part 165 traveling up/down in part 208

In a first sub-embodiment of this alternative embodiment, as shown in FIGS. 13 and 14A (wherein only one of the two parts of the motor, i.e., the one on the left is cut through) and FIG. 14B (wherein both parts of the motor are cut through), the power is transmitted from the two electric motors to the outer rim 140 via a mechanical power transfer system. The mechanical power transfer system comprises a sub-frame 229, a gear 209, a tube-type shaft 208, and a shaft 165. Each electric motor 160 has a gear 210 attached to the main shaft and is facing the gear 209 while in contact with it. The frame 159 houses therein one or preferably two electric motors 160, the sub-frame 229, and the pair of gears 210, the gear 209, and a tube-type shaft 208. The sub-frame 229 is positioned between the two electric motors 160 (electric motors 160 are rigidly attached to the sub-frame 229 by means of 6-8 bolts) and rigidly attached to the frame 159, preferably by means of bolts and most preferably by means of 6-8 bolts. The pair of gears 210 and the gear 209 which is located between the gears 210, are positioned in the void created by and surrounded by the sub-frame 229 and the two electric motors 160. The pair of gears 210 are each engaged with the respective driving shaft of the two electric motors 160, and are both engaged with the gear 209. The gear 209 is engaged with the shaft 208 on the top end thereof. Therefore, the power from the two driving shafts of the electric motors 160 is transmitted first to the respective gear 210, then combined and transmitted to the gear 209 and subsequently to the shaft 208 for further transmission in a downward direction to the rim. The shaft 208 can rotate about the longitudinal axes of the shaft freely relative to the sub-frame 229, preferably by means of at least two ball bearings 211 shown in FIGS. 14A and 14B.

In this first sub-embodiment of this alternative embodiment, a drive shaft 165 is provided substantially coaxial with the tube-type shaft 208 and is located at least partially inside the tube-type shaft 208. The portion of the drive shaft 165 between the lower end of the shaft 208 and the inner ring 130 is protected from the elements (water and debris) by gooseneck shaped protective sleeve 166 made of a flexible material resistant to water and other elements commonly encountered in use, such as a synthetic material including plastic or rubber.

The drive shaft 165 possesses an engaging feature extended along its length on its outer surface and the tube-type shaft 208 possesses a matching engaging feature along its length on its inner surface. As a result of the engagement, the drive shaft 165 can slide inside the shaft 208 but rotation relative to each other is prevented. In this regard, FIG. 14A shows the suspension and drive system in accordance with this embodiment wherein the springs 213 are lightly or moderately compressed, and FIG. 14B shows the suspension and drive system of the same embodiment wherein the spring 213 are severely compressed. It can be appreciated that when the drive shaft 165 slides inside the shaft 208 it maintains the coaxial relationship. The engaging feature on the drive shaft 165 can be at least one (preferably two or more arranged with equal or unequal distance there between) straight grooves extending in the same longitudinal direction on the outer surface of the drive shaft 165 and the corresponding matching engaging feature on the shaft 208 can be straight protruded portions extending in the same longitudinal direction on the inner surface of the shaft 208, that structurally match the straight grooves, and are of the same width, same numbers and the same positions. Alternatively the grooves can be provided on the outer surface of the drive shaft 165 and the matching straight protruded portions will therefore be provided on the inner surface of the shaft 208. Engaging surfaces of both shaft 208 and 165 will be lubricated with lubricant to decrease fracture.

In the first sub-embodiment of this alternative embodiment, as shown in FIGS. 13 and 14A-14B, the drive shaft 165 at its bottom end is connected to gear 206, the latter being in fixed position relative to the rotational axis of the outer ring 138. The drive shaft 165 can rotate through ball bearings 212 relative to the inner ring 130. The gear 206 is engaged with the gear 207, the latter being rigidly attached to the outer ring 140.

Therefore, the shaft 165 transmits the power received from the shaft 208, first to the gear 206, then to the gear 207, thus driving the rotation of the outer ring 140.

Figure 24A:
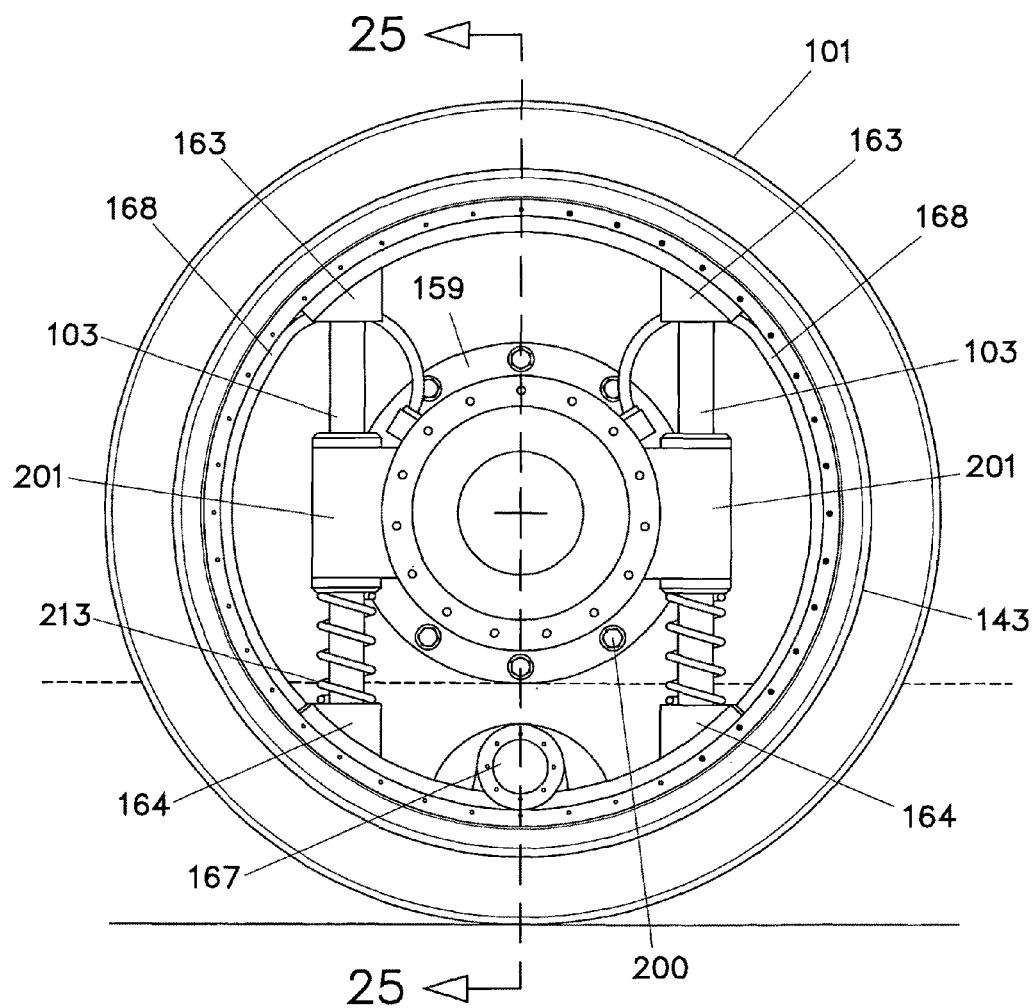
FIG. 24A is a side view of a hub-less wheel comprising an in-the-wheel suspension system in accordance with a second sub-embodiment of a second embodiment of the present invention, wherein the motor is located in the center of the hub-less wheel and the power is transferred through a hydraulic power transfer system.
Figure 24B:
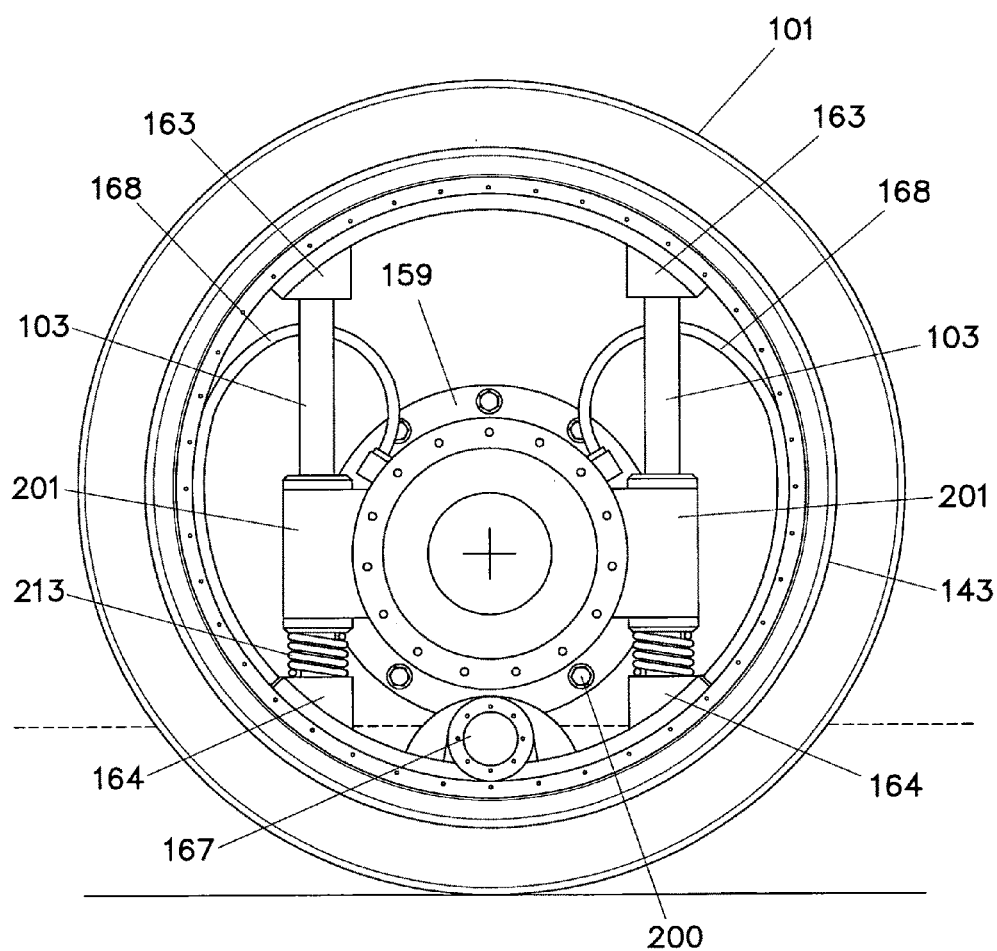
FIG. 24B is a side view of the hub-less wheel of FIG. 24A while traveling on uneven surface.
Figure 25:
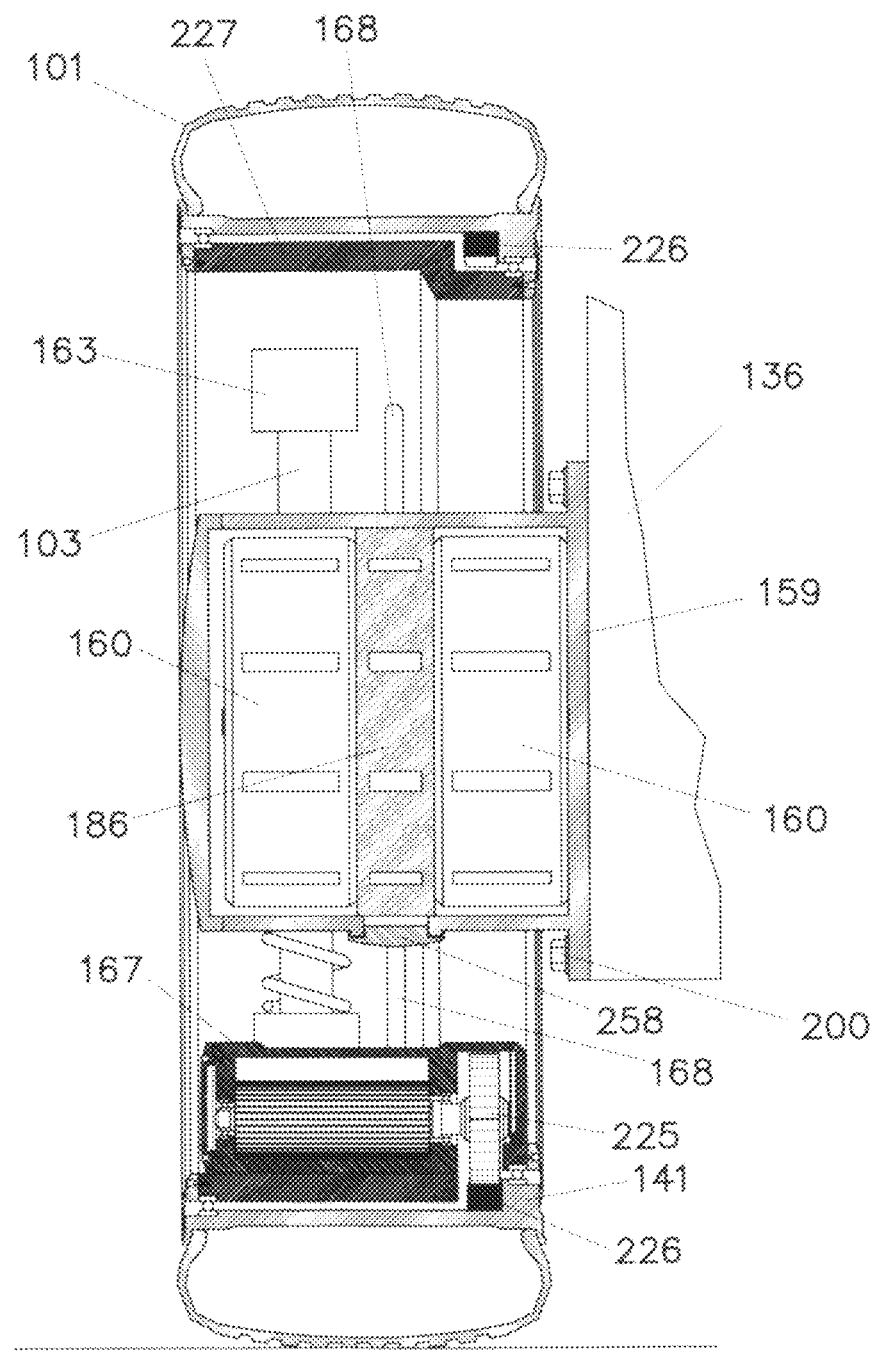
FIG. 25 is a cross-sectional view of the hub-less wheel shown in FIG. 24A taken along the line A25-A25.

In a second sub-embodiment of the alternative embodiment, a hydraulic drive system used to transfer motion from the two drive motor 160 to the outer ring 141, instead of the mechanical power transfer system discussed above in the first sub-embodiment As shown in FIGS. 24A, 24B and 25, the hydraulic drive system comprises a hydraulic pump 186, at least two flexible high-pressure delivery/return hoses 168, at least one hydraulic motor and gears for coupling the rotational motion of the drive shaft of the hydraulic motor to the outer rim 141. The hydraulic pump 186 is rigidly attached to the frame 159, preferably through a multitude of bolts, most preferably through 6-8 bolts. The hydraulic pump 186 effectively replaces the sub-frame 229 of the first sub-embodiment and is rigidly sandwiched between and rigidly attached to the two drive motor 160. The hydraulic pump 186 is coupled to the driving shafts of the two drive motor located on both sides and transfers the mechanical motion of the drive shafts of the drive motor 160 driving the pump 186 which pressures the hydraulic fluid, preferably an oil. At least one high-pressure delivery/return hose 168 is provided, and connected at one end to the hydraulic pump 186 and at the other end to the hydraulic motor 167. The hydraulic fluid contained in the closed loop formed by the hydraulic pump 186, the high-pressure delivery/return hose 168, and the hydraulic motor 167 transmits the power received from the hydraulic pump 186 into rotational motion of the drive shaft in the hydraulic motor 167. The hydraulic motor 167 is rigidly mounted to the inner ring 227 of the hub-less rim assembly 162. The rotational motion of the drive shaft in the hydraulic motor 167 is first coupled to a gear 225 located in the space between the inner ring 227 and the outer ring 141, then to a gear 226 with which the gear 225 interact with, and finally to the outer ring 141 to which the gear 226 is rigidly attached. The high-pressure hoses 168 are manufactured by using materials that are generally resilient and flexible and can easily, reversibly and repeatedly deformed during the damping motion as illustrated in FIGS. 24A-24B.

In forward drive the hose 168 plays the role of fluid delivery and hose 141a return role, when in reverse drive hose 168 plays the role of fluid return and hose 141a plays the role of fluid delivery by spinning electric motor 160 in the opposite direction.

Braking System

The braking system can be any that is known in the prior art and adaptable for use in the system of the present invention. Braking can be achieved by using a drive motor to slow down or stop a vehicle and recharge batteries at the same time in a process known as regenerative braking. Braking can also be achieved using a brake disc (not shown) connected to the outer ring with a friction pad (not shown) mounted to the inner ring (stationary ring) of the hub-less rim assembly. The same brake discs and friction pads can be used for parking brakes. Combinations of these braking systems are also contemplated.

Caster and Vehicle Ground Clearance Control Mechanism

As shown in FIGS. 17A-17B, 19, 20A-20C, 21, a mechanism 137 can be provided for controlling the caster angle and the vehicle ground clearance. The mechanism 137 is structurally and functional independent from any of the above mentioned embodiments of suspension and drive systems and therefore can be used in conjunction with any of them, providing the flexibility in controlling the caster angle and vehicle ground clearance if needed.

The camber angle can be adjusted through the brackets 134 and 135 by bolts 245. The camber angle can be achieved through a caster angle as is conventionally known in the prior art.

Figure 17A:
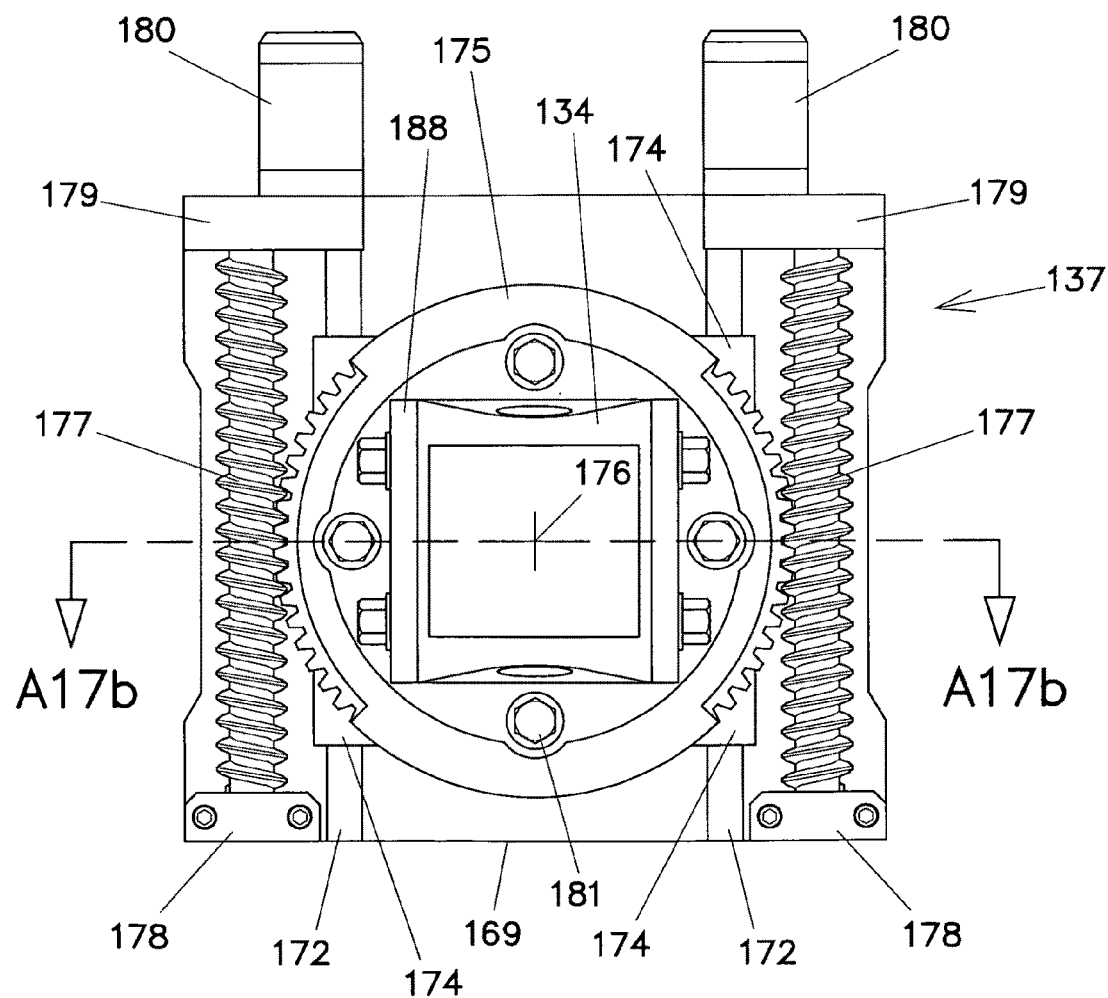
FIG. 17A is a front view of the vehicle ground clearance adjustment unit.

Referring to FIGS. 17A-17B, the mechanism 137 comprises a frame 169, a sub-frame 174, at least two vertical tracks 172, a frame 175, a pair of threaded shafts 177, a pair of gear housing 179 and a pair of electrical motors 180. The frame 169 has a first surface 170 and 171 a second surface is fixedly attached to two vertical guides 172 extending in a parallel manner on its surface 171 with a horizontal displacement there between. The vertical tracks 172 are slidably attached to a sub-frame 174 at a first surface thereof and effectively are sandwiched between the frame 169 and the sub-frame 174. Therefore, the sub-frame 174 and any parts fixedly attached thereto can slide along the vertical tracks 172 and thus move vertically relative to the frame 169. A gear-frame 175 is provided and attached to a second surface of the sub-frame 174 through ball bearings 173 as shown in FIG. 17A. As a result, the gear-frame 175 can rotate around the pivotal point 176 relative to the sub-frame 174. Yet no vertical motion of the gear-frame 175 relative to the sub-frame 174 is permitted. Two threaded shafts 177 are mounted to the second surface 170 of the frame 169 and are each located at the far left and right of the frame 169 as shown in FIGS. 17A-17B. The threads of the shafts 177 match the teeth of the gear frame 175. Brackets such as 178 are provided for mounting the threaded shafts 177 at their bottom ends to the frame 169 through a ball bearing, and at their top ends to the gear castings 179. An electrical motor 180 is attached to each gear casting 179 and the rotational motion of the motor 180 is therefore transmitted by the gear casting 179 to the threaded shaft 177, causing the gear frame 175 to rotate around the pivotal point 176 as shown in FIG. 21 causing a change of the castor of the wheel angle.

During installation, the mechanism 137 is rigidly attached to the chassis 136 of the vehicle at its first surface 170, preferably by way of a multitude of bolts (not shown). The gear frame 175 is coupled to the hub-less wheel assembly through the bracket 188 replacing bracket 135 discussed above in FIGS. 3 and 4. The bracket 188 can be rigidly attached to the gear 175 using any means known in the art, preferably through the use of a multitude of bolts 181.

Referring to FIGS. 20A-20C, there is shown a mechanism 137 at a different vehicle ground clearance. The vehicle ground clearance in the situation shown in FIGS. 17A and 20B is taken as a reference and it is also assumed that the relative rotational positions between the gear frame 175 and the frame 169 are such that in FIG. 17A, the caster angle is zero.

If the two motors 180 are used to rotate the two threaded shafts 147 in the same direction (clock wise or counter clock wise around their longitudinal axis) at the same angular speed, the gear-frame 175 and the wheel rigidly attached thereto will be allowed to move up and down in the vertical direction, resulting in a change in the vehicle ground clearance, i.e., the vertical displacement between the bottom level of the chassis and the ground. In effect, the sub-frame 174 moves up and down along the vertical tracks 172.

If the gear-frame 175 and the wheel attached to it move up relative to the frame 169 which is rigidly fixed to the vehicle chassis as shown in FIG. 20A the vehicle ground clearance adjustment (the vertical displacement between the lines 182 and 184, where line 182 represents the surface on which the vehicle is riding and line 184 represents vehicle under carriage line) is reduced compared to the displacement between the lines 182 and 184 shown in FIG. 20B.

Conversely, if the gear-frame 175 and the wheel move down relative to the frame 169 as shown in FIG. 20C, the vehicle ground clearance is increased in comparison with that which is shown in FIG. 20A or FIG. 20B.

It is noted that no rotation of the gear-frame 175 relative to the sub-frame 174 around the pivotal point 176 is produced, leading to no change in the caster angle.

If two motors 180 are used to rotate the two threaded shafts 177 in the opposite directions at the same angular speed, the gear-frame 175 and the wheel rigidly attached thereto will rotate accordingly relative to the sub-frame 174 around the pivotal point 176 without any change in the vertical displacement (see FIG. 21 relative to FIG. 17A). Therefore, the caster angle is changed from zero to a non-zero value (line 230 relative to line 19 in FIG. 21) defined by the angle between the vertical (gravitational or perpendicular line to the vehicle longitudinal line) axis 231 and the longitudinal axis of the vertical guides (longitudinal axes of vertical guides is parallel to the pivotal axes 228 facing the vehicle from the side) in the suspension system located in the wheel, while the vehicle ground clearance adjustment is left unchanged. It is apparent that the opposite rotation of the threaded shafts 177 (clockwise or counter clockwise) results in a rotation of the gear 175 around its rotational pivot 176.

When both the caster angle and the vehicle ground clearance need to be adjusted, the two operations as detailed above can be carried out in sequence. Alternatively, the change in the caster angle and change in the vehicle ground clearance can be produced in one operation by properly controlling the speed and direction of each shaft. The exact speed and direction for a particular objective can be readily determined.

Due to the advantageous design described above, the suspension and drive system of the present invention has a multitude of advantages over present vehicle designs, which include but are not limited to simplicity of the design and assembly, light weight, space savings, faster and low cost assembly and repair, independent controls on all wheels (steering, drive and all suspension-related functions), thereby improving overall vehicle performance, and optimizing suspension performance.

Figure 15:
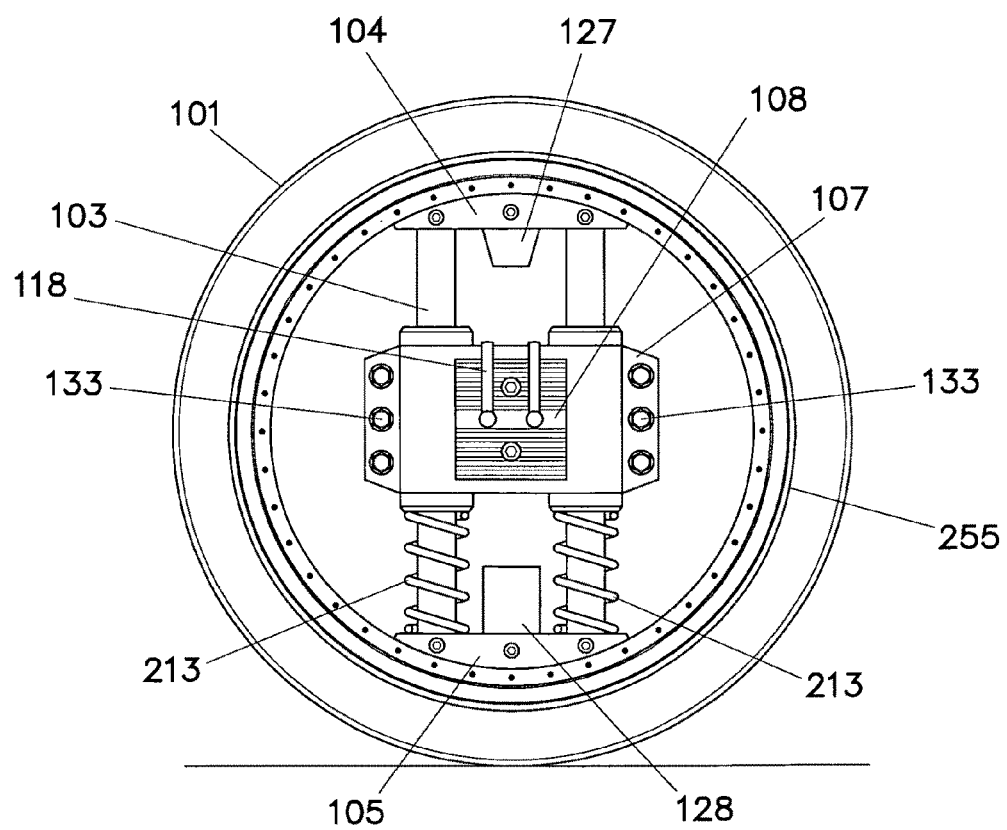
FIG. 15 is a side view of the hub-less wheel of FIG. 1 viewed from the direction of 2-2 wherein the rim has a built-in electric motor.

The design configuration will allow manufacturers to use the same parts or even the same units, or after minor changes, in different vehicle designs. As shown in FIGS. 2 and 15, identical suspension systems can be used with two different hub-less wheel designs. In FIG. 2, an electric motor is built into the rim and the wheel can be used as a drive wheel. In FIG. 15, the rim does not have a built-in electric motor and the wheel is not a drive wheel, for example, the rear wheels on a front drive vehicle, front wheels on a rear drive vehicle, or the wheels on the trailer for a tractor-trailer. In addition, the design of the present invention, having independent and self-contained functions (steering, drive, suspension, caster, ground clearance adjustment and braking) in modular units allows manufacturers to use the same unit in many different vehicle designs and applications, leading to reductions in manufacturing costs.

The assembly of the present invention is designed with the intention to allow a fast attachment and detachment of the wheel and suspension system, for example through the use of simple fixing means, such as 4 or 6 lug nuts 133 as seen in FIG. 6 for mounting absorber unit 107 to the steering knuckle 132. As an alternative to the removal of the bolts 133, the brackets 104a and 105a can be quickly removed to release the hub-less rim assembly 143 from the suspension vertical guides 103, as seen in FIG. 8. A third way to remove the complete wheel and suspension assembly as one unit is by detaching the bracket 135 from the vehicle chassis 136 by removing the 4 or more bolts 185. If the vehicle ground clearance and caster control unit 137 is used, by removing the bolts 181, the bracket 188 detaches from the gear-frame 175, removing a wheel, suspension system and the bracket 188 as one unit.

The motor can be placed in various locations in accordance with the present invention. For example, the electrical motor can be placed inside the two-ring rim as seen in FIGS. 1, 22, 23 or three-ring rim as seen in FIGS. 3, 4, 9B. The electrical motor may also be placed next to the vehicle chassis partially or completely inside the wheel space, and used as a frame to hold the suspension-wheel assembly as seen in FIGS. 12, 13, 24A. The electrical motor can further be placed to the inside chassis space (as in traditional vehicle design), and rotational force may be transmitted through variable length drive shaft, hydraulic system or conventional chain drive as known in the art.

Figure 18:
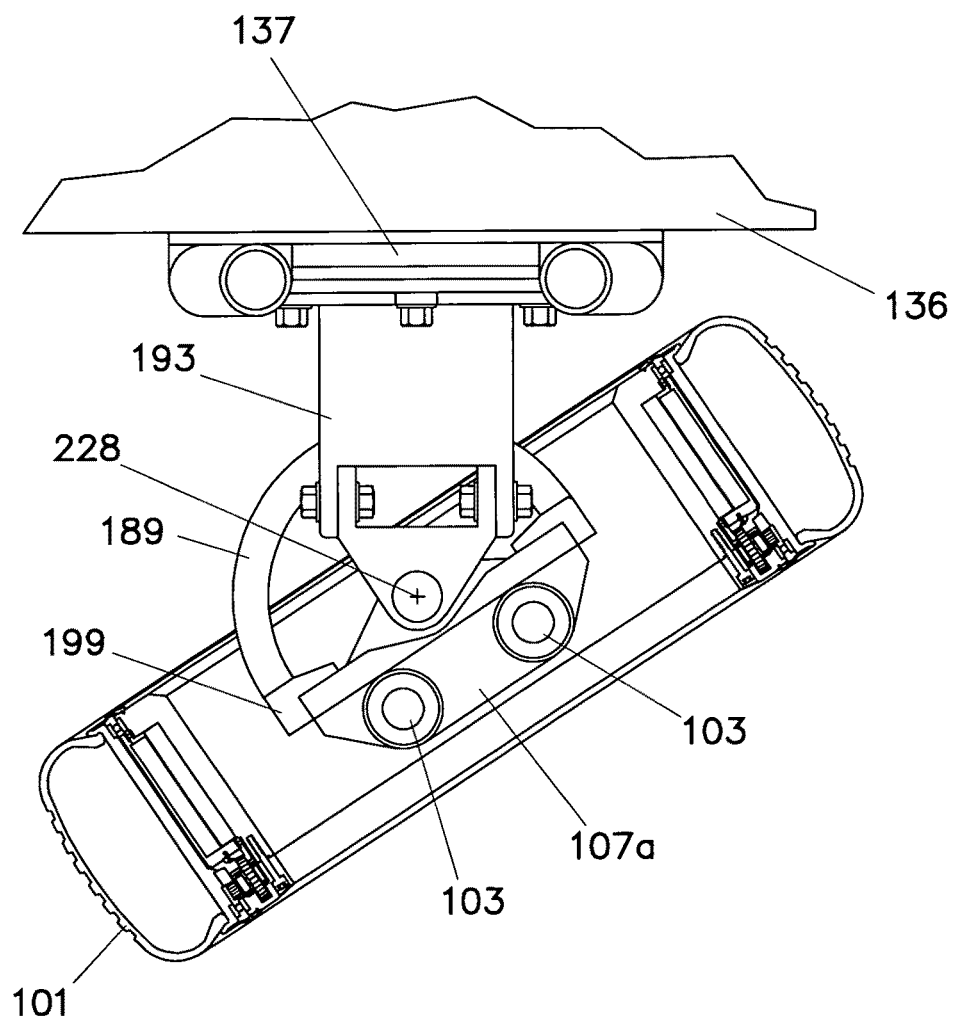
FIG. 18 is a top/plan view of the suspension system and ground clearance adjustment unit with hub-less wheel 102 cut-out for better visibility.
Figure 19:
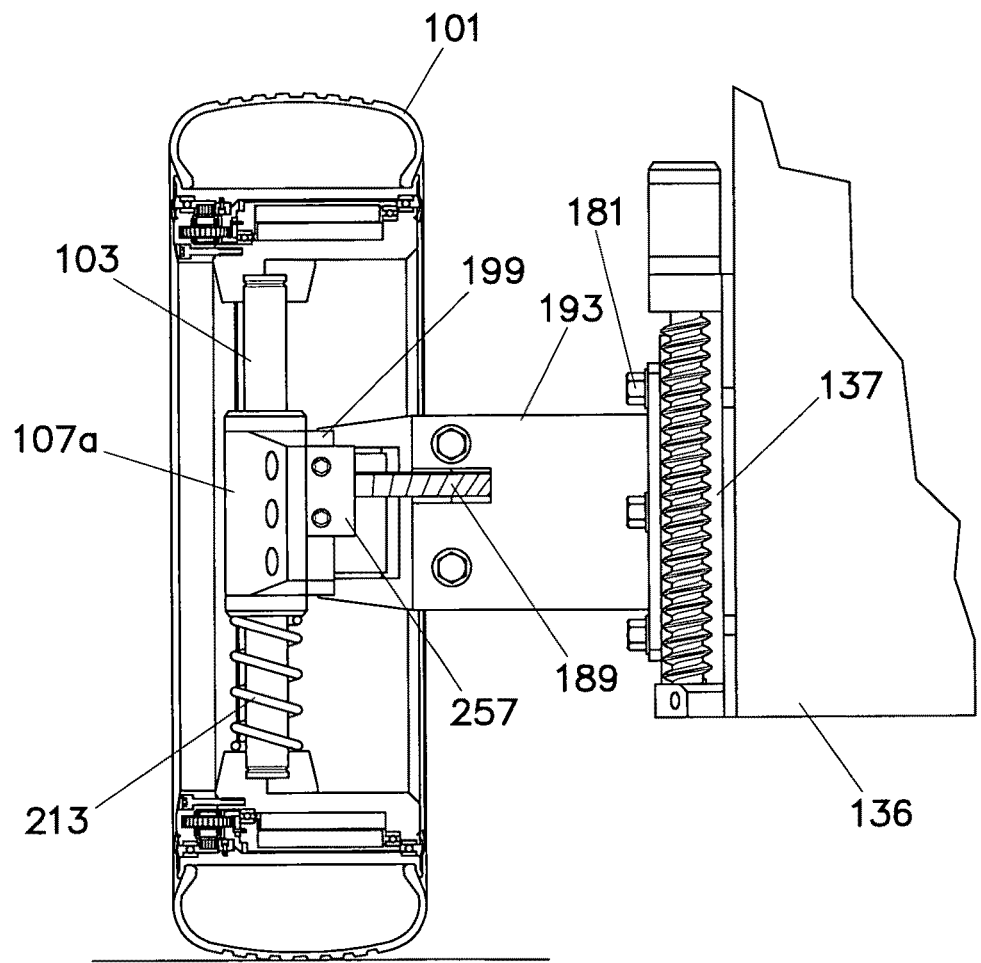
FIG. 19 is a front view of the suspension system and vehicle ground clearance adjustment unit with hub-less wheel 102 partially cut-out for better visibility.
Figure 26B:
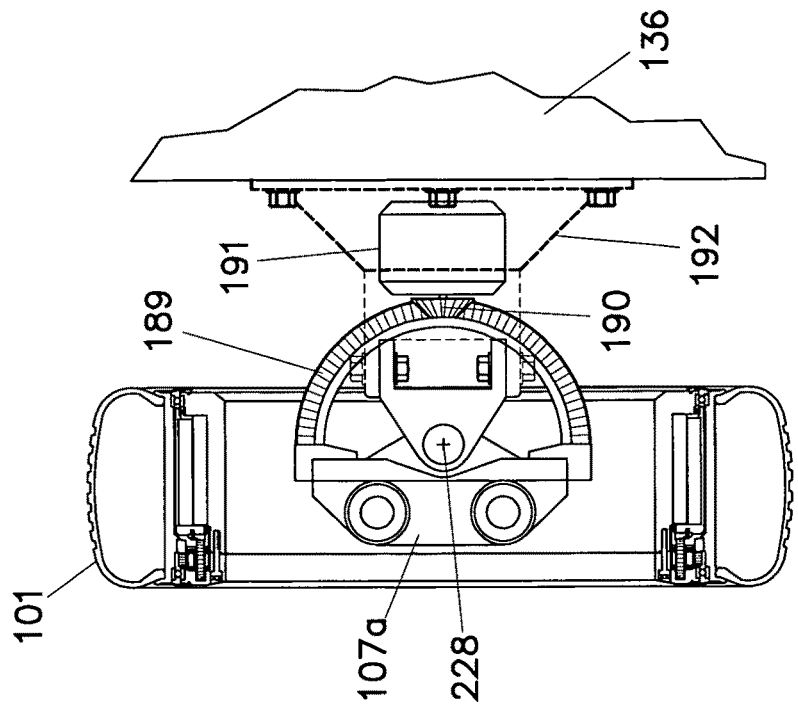
FIG. 26B is another top view of the suspension system with the hub-less wheel cut for better viewing and comprising a steering system in accordance with a second embodiment of the present invention, wherein steering is powered through electric motor.
Figure 26A:
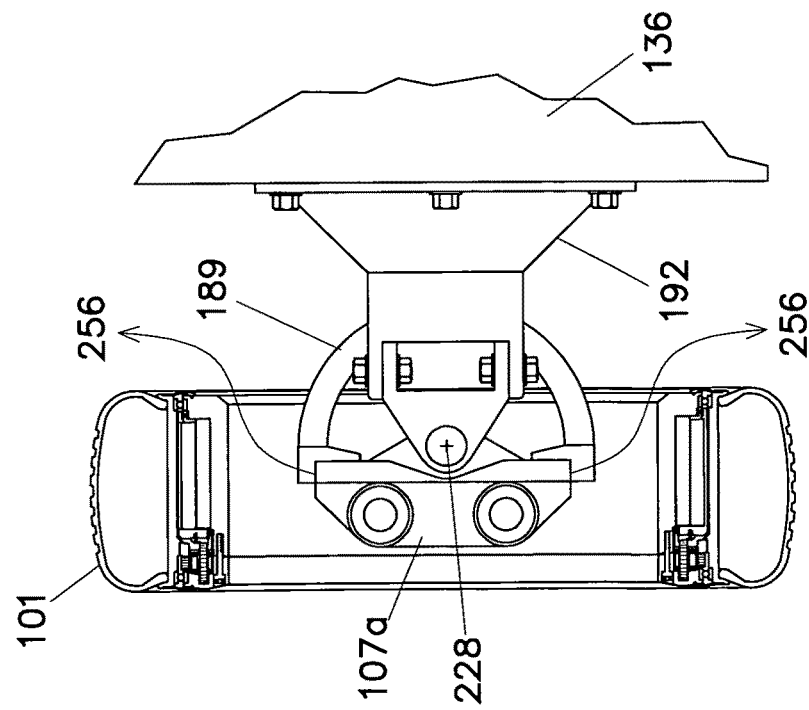
FIG. 26A is a top view of the suspension system with the hub-less wheel cut for better viewing and comprising a steering system in accordance with a second embodiment of the present invention, wherein steering is powered through electric motor.

With respect to steering, the suspension and drive system of the present invention can be designed so that the in-wheel steering axis will pass through the wheels contact patch area or slightly in front of the wheel contact patch, resulting in reduction in steering forces and tire-wear. The steering is achieved by hydraulic or electrical actuator 187 as seen in FIGS. 4, 7A-7C. Each wheel will have its own individual actuator 187, one end of which is attached to the bracket 135 and the other end of which is attached to the steering knuckle 132 as seen in FIG. 4. If the vehicle ground clearance adjustment and caster control unit 137 are used, the steering actuators 187 will have one end thereof attached to the bracket 188 and the other end attached to the steering knuckle 199 (steering knuckle 199 with zero degree caster). Other steering options may be used, including the gear 189 and the electrical motor 191 being placed inside the bracket 192 (bracket 193 if vehicle ground clearance adjustment and caster control unit 137 are used as seen in FIGS. 18 and 19, as seen in FIGS. 26A-26B). Shown in FIGS. 26A, 26B and 27A-27B is a steering arrangement with a horizontally placed semi-circularly shaped gear 189 and an electrical motor 191.

Figure 28B:
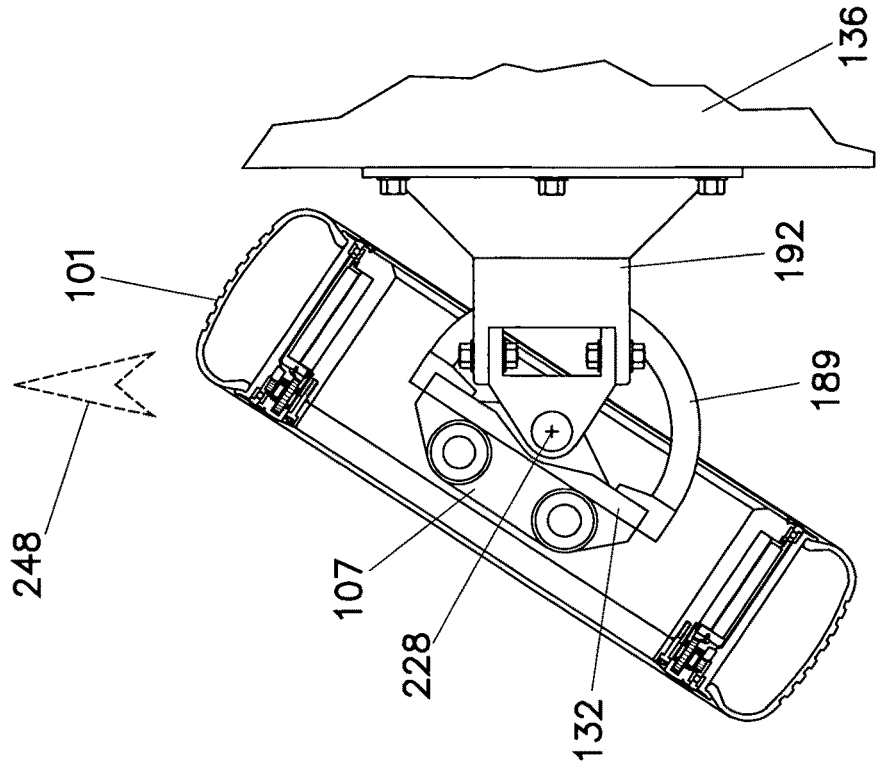
FIG. 28B is a different representation of FIG. 26A showing a rotational angle at the pivotal point.
Figure 28A:
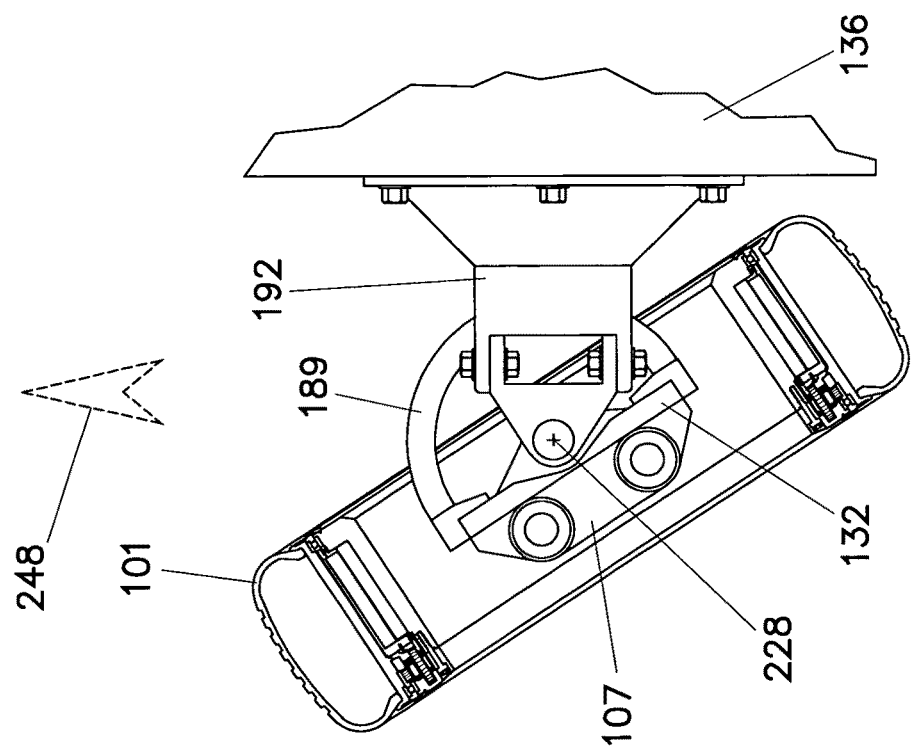
FIG. 28A is a representation of FIG. 26A showing a rotational angle at the pivotal point.

The two ends of the semi-circularly shaped gear are rigidly attached to the side 256 of the knuckle 132 (see FIGS. 26A and 27A). The power from the high torque electrical-step motor is directly coupled to a gear 190, which is engaged with the gear 189 as seen in FIGS. 26B and 27B. Therefore, the electrical motor 191 can drive the gear 189, changing the steering direction of the wheel as shown in FIGS. 28A and 28B.

Since each wheel (two or more, depending on the vehicle design) has its own independent steering control, a vehicle can travel in almost any direction on the XZ plane, as seen in FIGS. 30A-30E. Independent steering control of each unit will allow a driver, with help from an on board computer system, to control vehicle pivot-point position relative to the vehicle center point, leading to more flexible and precise control in turns.

A central on board computing system can be provided which controls all wheel differentials. By detecting and responding to the exact position (angle and etc.) of each wheel relative to the vehicle chassis and each other, the speed, direction, camber angle, caster angle and toe of each wheel independently through sensors (such as mechanical sensors, optic sensors), central computing system can independently calculate and independently change these parameters according to driving and road conditions for optimal performance. In one embodiment, these parameters were measured using the corresponding sensors. Optimum values of these parameters are determined by the central computing system taking into consideration the direction and speed of the vehicle and other factors such as road conditions. The difference between the optimum value and the measured value for each parameter is calculated. An appropriate actuator is activated in response to the sign and magnitude of the difference. If needed, subsequent measurement and fine adjustment can be carried out continuously.

Each unit will have sensors to gather data needed for the central computing system to calculate and adjust all functions of each assembly. In essence, all mechanical functions of the suspension and drive assembly of the present invention are controlled electronically and individually on each wheel, leading to optimal wheel and suspension positions at all times. As a result of the improved structure of the present invention, the caster angle and vehicle ground clearance, steering, suspension braking, drive motor, and differential can be readily, accurately and independently controlled for each wheel. The vehicle equipped with the suspension and drive system of the present invention possesses improved vehicle balance and performance (acceleration, braking and traction) over standard vehicles.

As seen in FIGS. 29A and 29B, the suspension and drive assembly of the present invention can be used in double-wheel configuration, such as that used on the heavy-duty pickup trucks and tractor-trailers. Two identical, hub-less rim assemblies are attached to the bracket assembly 194 (which consists of brackets 195 and 196), which in turn is rigidly attached to the vehicle chassis 136, so that both units have independent suspension travel and drive motors. Bracket assembly 194 comprised of bracket 195 and bracket 196. Bracket 196 includes permanently attached shock absorber unit 162c and is directly attached to vehicle chases 136. Shock absorber unit 107 is attached to bracket 195 with bolts 133. Bracket 195 is attached to bracket 196 with bolts 109c. This configuration is provided on each non steerable wheel, allowing independent suspension movement as seen in FIG. 29A-29B (line 182 represents leveled road surface and line 182 represents uneven road surface). Independent control of drive motor speed will allow for all wheel-differential, even between the wheels in double-wheel configuration (not available in today's vehicles) between as many wheels as vehicle design requires.

If desired, the assembly can be installed on trucks and trailers instead of regular wheels, allowing a truck or a trailer to pull its own weight and load. Extra batteries can be stored in the truck or trailer's platform, extending travel distance.

The invention claimed is:

1. An in-the-wheel hub-less suspension system for use on a vehicle comprising: at least two vertical guides;
   at least two mounting brackets to be affixed to diametrically opposing positions on the rim of the wheel to which the suspension system is to be attached;
   at least one shock absorber unit;
   one spring for each vertical guide;
   at least one cavity; at least one top orifice; at least one bottom orifice;
   at least one top cap with a first through-hole; at least one bottom cap with a second through-hole;
   at least one first seal for each of said at least one top cap; and
   at least one second seal for each of said at least one bottom cap;
   wherein each of said at least two vertical guides extends through one of said at least one shock absorber unit, wherein said spring for each vertical guide is located underneath said at least one shock absorber unit and encloses said vertical guide; wherein each end of each of said at least two vertical guides engages with the corresponding mounting bracket;
   wherein said top orifice and said bottom orifice are coaxial, wherein said top cap is secured onto said top orifice and said bottom cap is secured onto said bottom orifice,
   wherein said first hole in said top cap, said top orifice, said second hole in said bottom cap, said bottom orifice and said at least one cavity form a third through-hole through which each of said at least two vertical guides extend, and
   wherein said at least one first seal for each of said at least one top cap creates a tight seal between the at least one top cap and the vertical guide and the said at least one second seal for each of said at least one bottom cap creates a tight seal between the at least one bottom cap and the vertical guide.

2. The suspension system of claim 1, further comprising:
   an inner ring of the hub-less rim;
   an outer ring of the hub-less rim; and
   a drive system comprising an electric step motor comprising a stator part and a rotary part, said stator part being attached to said inner ring and said rotary part being attached to said outer ring.

3. The suspension system of claim 1, further comprising:
   an inner ring of the hub-less rim; a middle ring of the hub-less rim;
   an outer ring of the hub-less rim; and
   a drive system comprising an electric step motor located in the rim structure and comprising a stator part and a rotary part, said stator part being attached to said inner ring and
   said rotary part being attached to said middle ring.

4. The suspension system of claim 1, further comprising:
   a frame located in the hub of the rim, said frame adapted for attachment to the chassis of the vehicle;
   a two-part drive motor located inside said frame; and
   a mechanical power transfer system comprising: a first pair of gears coupled to the drive shaft of each part of the two-part drive motor, and located inside said frame;
   a third gear coupled to said first pair of gears and located in said frame; a first shaft having a first end and a second end, said first end of said first shaft being engaged with said third gear;

a second shaft located coaxial to said first shaft and having a first end and a second end, said second end of said first shaft being engaged with said first end of said second shaft;

a fourth gear engaged to said second end of said second shaft; and a fifth gear engaged to said fourth gear and being rigidly attached to the outer ring; wherein said first shaft further comprises a first engaging means and said second shaft further comprises a first matching engaging means and said first engaging means and said second engaging means engage to allow the transmission of rotational motion from said first shaft to said second shaft about the common longitudinal axis.

5. A system for use on a hub-less rim on a vehicle as in claim 4 wherein said two-part drive motor is an electric step motor.

6. The suspension system of claim 1, further comprising:

an inner ring of the hub-less rim; an outer ring of the hub-less rim; a frame located in the hub of the rim, said frame being adapted for attachment to the chassis of the vehicle;

a two-part drive motor located inside said frame; and a hydraulic power transfer system comprising: a hydraulic pump rigidly attached to said frame and coupled to the drive shafts of the two-part drive motor;

at least one hydraulic motor rigidly mounted onto said inner ring;

at least one high-pressure hose having a first end and a second end, said first end connected to said hydraulic pump and said second end connected to said hydraulic motor;

a hydraulic fluid in the hydraulic pump, the hydraulic motor and the high-pressure hose;

a first gear located in the space between said inner ring and said outer ring, said first gear coupled to the drive shaft of said hydraulic motor; and a second gear rigidly connected to said outer ring, said second gear engaged with said first gear.

7. A system for use on a hub-less rim on a vehicle as in claim 6 wherein said two-part drive motor is an electric step motor.

* * * * *